US008768581B2

(12) United States Patent
Mizuochi et al.

(10) Patent No.: US 8,768,581 B2
(45) Date of Patent: Jul. 1, 2014

(54) WORK MACHINE SAFETY DEVICE

(75) Inventors: Mariko Mizuochi, Hitachinaka (JP); Akinori Ishii, Ushiku (JP); Jinichi Yamaguchi, Hino (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 35 days.

(21) Appl. No.: 13/699,094

(22) PCT Filed: May 24, 2011

(86) PCT No.: PCT/JP2011/061886
§ 371 (c)(1),
(2), (4) Date: Nov. 20, 2012

(87) PCT Pub. No.: WO2011/148946
PCT Pub. Date: Dec. 1, 2011

(65) Prior Publication Data

US 2013/0066527 A1 Mar. 14, 2013

(30) Foreign Application Priority Data

May 24, 2010 (JP) ................................ 2010-118584

(51) Int. Cl.
*B66F 17/00* (2006.01)
*G01M 1/12* (2006.01)

(52) U.S. Cl.
USPC ............................................ 701/50; 701/124

(58) Field of Classification Search
CPC ..... B66C 23/90; B66F 9/07559; B66F 17/00; E02F 9/2257; B60R 16/0233; B60R 2021/01306; B62D 49/08; G10M 1/122
USPC ................. 701/38, 45, 50, 124; 180/282, 290
See application file for complete search history.

(56) References Cited

U.S. PATENT DOCUMENTS

| | | | | |
|---|---|---|---|---|
| 4,284,987 A * | 8/1981 | Gibson et al. | ................. | 340/689 |
| 5,160,055 A * | 11/1992 | Gray | ............................ | 212/278 |

(Continued)

FOREIGN PATENT DOCUMENTS

| | | |
|---|---|---|
| JP | 61-287696 | 12/1986 |
| JP | 7-247578 | 9/1995 |

(Continued)

*Primary Examiner* — Jason Holloway
(74) *Attorney, Agent, or Firm* — Antonelli, Terry, Stout & Kraus, LLP.

(57) ABSTRACT

Disclosed is a safety system for a working machine, which allows an operator to instantaneously, readily and precisely recognize current stability during work including operations of a front working mechanism and swing operations. In a safety system for a working machine, a controller is provided with a ZMP calculating means (60*f*) for calculating coordinates of a ZMP by using position information, acceleration information and external force information on respective movable portions of a main body, which includes a front working mechanism, and undercarriage, and a stability computing means (60*d*) for calculating a support polygon formed by plural ground contact points of the working machine with a ground, and, when the ZMP is included in a warning region formed inside a perimeter of the support polygon, producing a tipping warning; the safety system is provided with a display (61*d*) for displaying a top plan view of the working machine and a ZMP position of the working machine relative to the support polygon; the ZMP calculating means and stability computing means compute and display the ZMP position and the support polygon including the warning region therein; and the safety system produces a tipping warning when the calculated ZMP position is included in the warning region formed inside the perimeter of the support polygon.

8 Claims, 18 Drawing Sheets

(56) References Cited

U.S. PATENT DOCUMENTS

| | | | | |
|---|---|---|---|---|
| 6,991,119 | B2 * | 1/2006 | Puszkiewicz et al. | 212/277 |
| 2009/0112409 | A1 * | 4/2009 | Tollenaar | 701/50 |
| 2010/0322753 | A1 * | 12/2010 | Brooks et al. | 414/718 |

FOREIGN PATENT DOCUMENTS

| | | |
|---|---|---|
| JP | 10-291779 | 11/1998 |
| JP | 2006-150567 | 6/2006 |
| JP | 2008-12642 | 1/2008 |

* cited by examiner

WORK MACHINE SAFETY DEVICE

TECHNICAL FIELD

This invention relates to a safety system for a working machine, and specifically to a safety system that, in a self-propelled working machine useful in demolition work, construction work, civil engineering work and/or the like, informs an operator of information on the stability of the machine.

BACKGROUND ART

Known as construction machines employed in demolition work of structural objects, dismantling work of waste, civil engineering or construction work, and/or the like include those having an upperstructure mounted rotatably on an undercarriage, which can travel by a power system, and a multi-articulated front working mechanism attached pivotally up and down to the upperstructure and drivable by actuators. As one example of such working machines, there is a demolition work machine constructed by using a hydraulic excavator as a base. This demolition work machine includes a front working mechanism, which is comprised of a boom and arm and is connected pivotally up and down to an upperstructure, and a working attachment such as a grapple, bucket, breaker, crusher or the like attached to a free end of the arm, so that it can perform work such as demolition work of structural objects or dismantling work of waste.

Such a working machine performs work by variously changing its posture with a boom, arm and working attachment, which make up a front working mechanism, being kept extending to an outside of the upperstructure. The working machine may, therefore, lose a balance and tip over if an unreasonably aggressive operation is performed. It is, hence, required for an operator to safely perform the work while precisely grasping the current stability or tipping risk of the working machine. The term “stability” as used herein means how stably a working machine can continue work on a work surface without tipping.

For such a requirement, there is disclosed, for example, in Patent Document 1 a system that calculates a center of gravity of a crawler crane and a load applied thereon from output values of load indicators arranged at stabilizer parts of the crawler crane and clinometers arranged on a crawler, and further, that determines in which one of preset regions the calculated center of gravity is located and displays the center of gravity on a monitor by using a color designated specifically for that region.

As another example, Patent Document 2 discloses a system that is provided with stabilizer projection width sensors and stabilizer reaction force sensors, calculates a tipping limit from output values of the stabilizer projection width sensors, calculates degrees of risk to tipping at the front, rear, left and right from output values of the stabilizer reaction force sensors, calculates a combined center of gravity of a crane from the output values of the stabilizer projection width sensors and stabilizer reaction force sensors, displays them on a display, and, if there is a risk of tipping, triggers a warning, and further, fixes passive joint units of respective stabilizers to avoid tipping.

PRIOR ART DOCUMENTS

Patent Documents

Patent Document 1: JP-A-61-287696
Patent Document 2: JP-A-10-291779

DISCLOSURE OF THE INVENTION

Problem to be Solved by the Invention

Now taking actual work into consideration, a working machine is used in a variety of work so that a quick motion is required in some instances or a change in motion takes place in other instance. In such work, an inertia force is produced by a motion of a front working mechanism or a motion of the working machine itself. Compared with quasi-static work such as crane operation that motions are relatively limited and no much changes are made in motion, an inertia force by a dynamic (abrupt) motion of the machine significantly affects the stability. Nonetheless, effects by such dynamic motions are not considered in the above-described conventional technologies.

Considerable variations take place in stability while a dynamic motion is underway. If only the current center of gravity is displayed, the operator is required to always keep a close watch on a display screen, leading to a possible reduction in work efficiency. In some instances, the operator may not be able to accurately recognize the stability.

With the foregoing problem in view, the present invention has as an object thereof the provision of a safety system for a working machine, which allows an operator to instantaneously, readily and precisely recognize current stability during work including operations of a front working mechanism and swing operations.

Means for Solving the Problem

To solve the above-described problem, the present invention has adopted a means such as that to be described next:

A safety system for a working machine provided with an undercarriage, a working machine main body mounted on the undercarriage, a front working mechanism attached pivotally in an up-and-down direction to the working machine main body, and a controller for controlling these undercarriage, working machine main body and front working mechanism, wherein the controller is provided with a ZMP calculating means for calculating coordinates of a ZMP by using position information, acceleration information and external force information on respective movable portions of the main body, which includes the front working mechanism, and undercarriage, and a stability computing means for calculating a support polygon formed by plural ground contact points of the working machine with a ground, and, when the ZMP is included in a warning region formed inside a perimeter of the support polygon, producing a tipping warning; the safety system is provided with a display for displaying a top plan view of the working machine and a ZMP position of the working machine relative to the support polygon; the ZMP calculating means and stability computing means compute and display the ZMP position and the support polygon including the warning region therein; and the safety system produces a tipping warning when the calculated ZMP position is included in the warning region formed inside the perimeter of the support polygon.

Advantageous Effects of the Invention

The present invention is equipped with the above-described configuration, and therefore, can provide a safety system for a working machine, which allows an operator to instantaneously, readily and precisely recognize current stability during work including operations of a front working mechanism and swing operations.

MODES FOR CARRYING OUT THE INVENTION

First Embodiment

With reference to the drawings, a description will hereinafter be made about the first embodiment of the present invention.

<Applied Machine>

Figure 1:
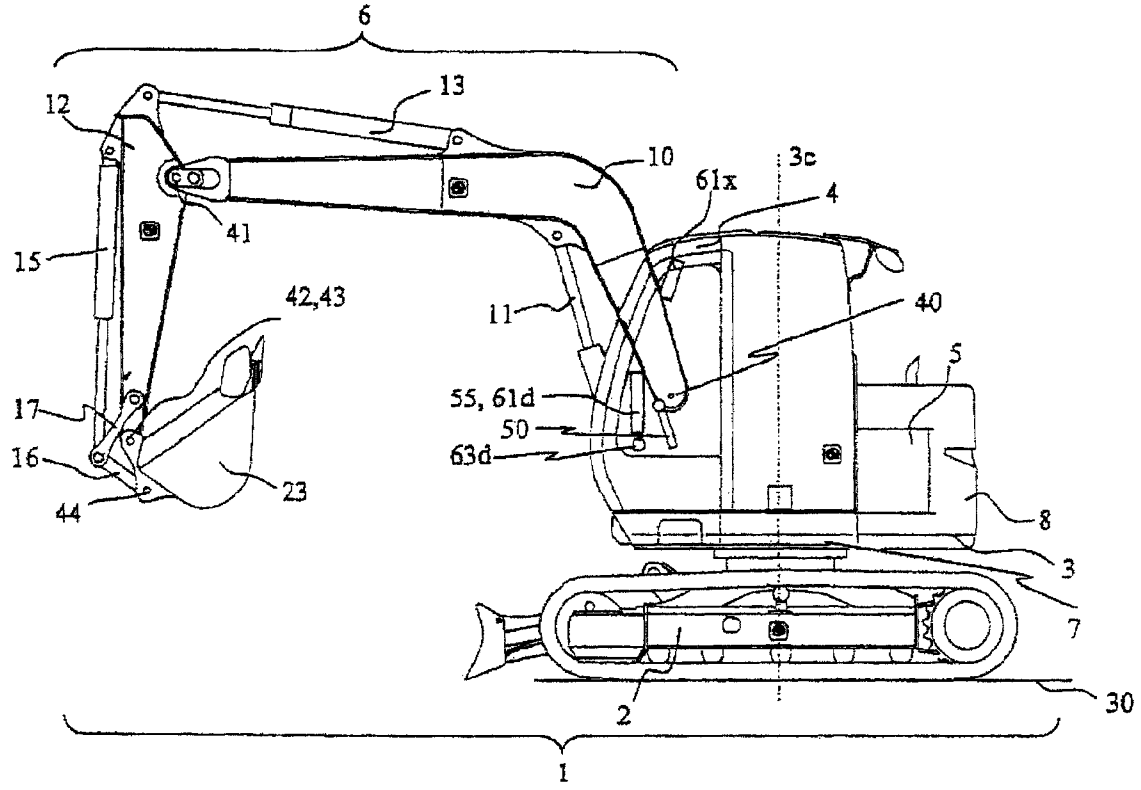
FIG. 1 is a side view showing a working machine according to a first embodiment applied thereto.

FIG. 1 is a side view of a working machine to which the present invention is applied. In the working machine 1, an upperstructure 3 is rotatably mounted on an upper section of an undercarriage 2, and the upperstructure 3 is rotatably driven about a center line 3*c* by a swing motor 7. On the upperstructure 3, an operator's cab 4 and an engine 5 which makes up a power system are mounted. On a rear part of the upperstructure 3, a counterweight 8 is mounted. Numeral 30 designates a ground surface. The upperstructure 3 is further provided with an operation control system that controls start and stop and entire operations of the working machine 1.

In a front working mechanism 6 arranged on a front of the working machine 1, a boom cylinder 11 is a drive actuator for pivoting a boom 10 about a fulcrum 40, and is connected to the upperstructure 3 and boom 10. An arm cylinder 13 is a drive actuator for pivoting an arm 12 about a fulcrum 41, and is connected to the boom 10 and arm 12. A working attachment cylinder 15 is a drive actuator for pivoting a bucket 23 about a fulcrum 42, and is connected to the bucket 23 via a link 16 and also to the arm 12 via a link 17. The bucket 23 can be replaced to another working attachment (not shown) such as a grapple, cutter or breaker as desired.

Arranged in the operator's cab 4 which is mounted on the upperstructure 3 for an operator who operates the working machine 1 are control levers 50 for inputting operating instructions from the operator to the respective drive actuators, a display 61*d* for displaying stability information, tipping warning information and the like about the working machine 1, a warning device 63*d* for producing a tipping warning sound or the like with respect to the working machine 1, and a user setting input means 55 for allowing the operator to perform settings of the safety system.

<Safety System>

Figure 2:
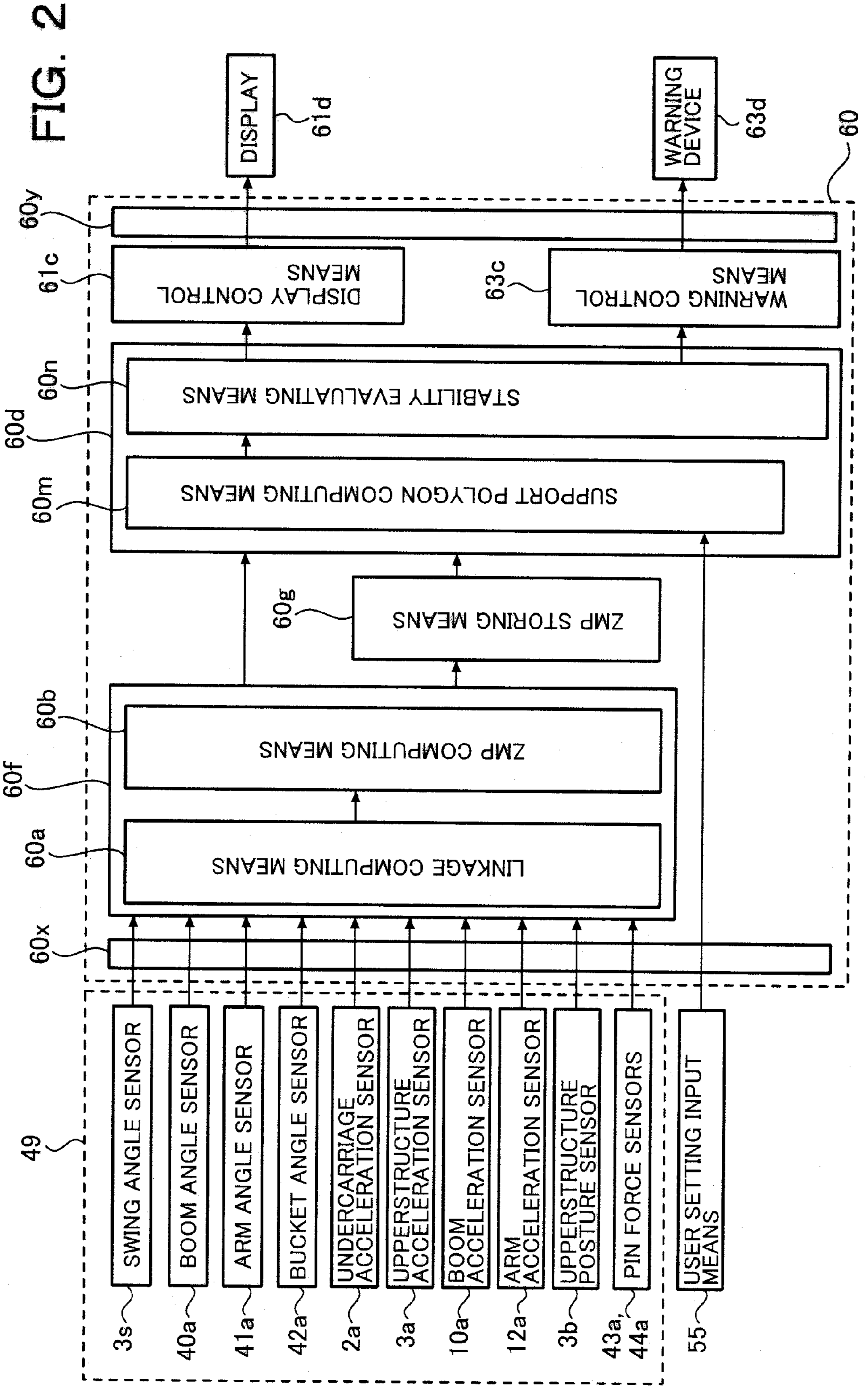
FIG. 2 is a block diagram illustrating the safety system according to the first embodiment for the working machine.

FIG. 2 is a block diagram illustrating an outline configuration on the safety system. The safety system is provided with state quantity sensing means (sensors) 49 arranged at various parts of the working machine 1 to detect the posture or the like of the working machine 1, the user setting input means 55 for allowing the operator to perform setting of the safety system, a controller 60 for performing predetermined computations based on detection values of the state quantity sensing means 49, the display 61*d* for presenting stability information to the operator, and the warning device 63*d*.

As the controller 60, those relating specifically to the safety system in the controller for the working machine 1 are shown. The controller 60 is further provided with an input unit 60*x* in which signals from the state quantity sensing means 49 and user setting input means 55 are inputted, a ZMP calculating means 60*f* for performing calculation of a ZMP position 70 upon receipt of the signals inputted to the input unit 60*x*, a ZMP storing means 60*g* for storing, for a predetermined time period, results of the calculation by the ZMP calculating means 60*f*, a stability computing means 60*d* for performing calculation of stability and determination of a risk of tipping based on the results of the calculation by the ZMP calculating means 60*f*, a display control means 61*c* and warning control means 63*c* for determining outputs to the display 61 and warning device 63*d*, respectively, based on output signals from the stability computing means 60*d*, and an output unit 60*y* for outputting output signals from the display control means 61*c* and warning control means 63*c* to the display 61*d* and warning device 63*d*, respectively. Further, the ZMP calculating means 60*f* is provided with a linkage computing means 60*a* and ZMP computing means 60*b*.

The controller 60 has an unillustrated microcomputer and peripheral circuitry, and the microcomputer is provided with CPU and a memory unit including ROM, RAM, a flash memory and the like. A computer program is stored in the ROM, and is executed on the CPU to perform computational processing.

The present invention assists safe work by presenting the results of calculation of a ZMP position and the determination of stability, which have been computed by the controller 60, via the display 61*d* and warning device 63*d* such that the operator is allowed to recognize them instantaneously and precisely.

<State Quantity Detection Means>

Figure 3:
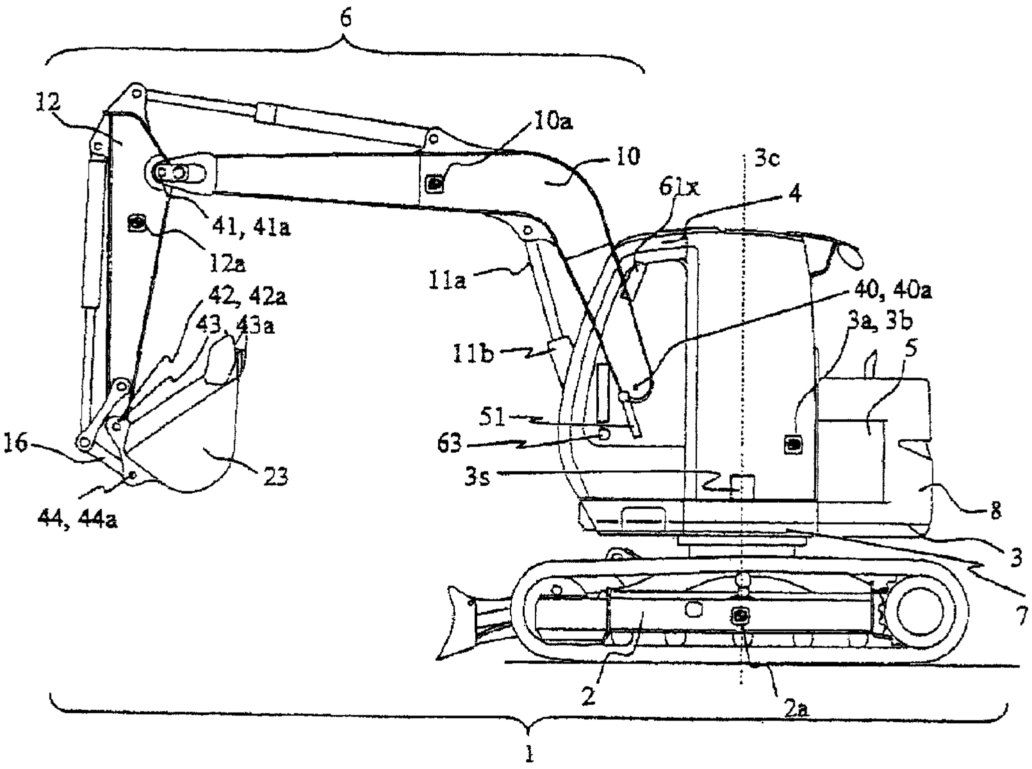
FIG. 3 is a side view showing the arrangement of sensors in the safety system according to the first embodiment for the working machine.

With reference to FIG. 3, a description will be made about the state quantity sensing means (sensors) 49 arranged at various parts of the working machine 1.

<Posture Sensors>

The upperstructure 3 is provided with a posture sensor 3*b* for detecting a tilt of the below-described machine reference coordinate system relative to a world coordinate system that uses, as a Z-axis, a direction opposite to the gravity. The posture sensor 3*b* is, for example, a tilt angle sensor, and by detecting a tilt angle of the upperstructure 3, detects a tilt of the machine reference coordinate system relative to the world coordinate system.

<Angle Sensors>

On the center line 3*c* of rotation of the upperstructure 3, a swing angle sensor 3*s* is arranged to detect a swing angle of the upperstructure 3 relative to the undercarriage 2.

At the fulcrum 40 between the upperstructure 3 and the boom 10, a boom angle sensor (angle sensor) 40*a* is arranged to measure a pivot angle of the boom 10.

At the fulcrum 41 between the boom 10 and the arm 12, an arm angle sensor (angle sensor) 41*a* is arranged to measure a pivot angle of the arm 12.

At the fulcrum 42 between the arm 12 and the bucket 23, a bucket angle sensor 42*a* is arranged to measure a pivot angle of the bucket 23.

<Acceleration Sensors>

In the neighborhoods of the centers of gravity of the undercarriage 2, upperstructure 3, boom 10 and arm 12, an undercarriage acceleration sensor 2*a*, upperstructure acceleration sensor 3*a*, boom acceleration sensor 10*a* and arm acceleration sensor 12*a* are arranged, respectively.

<Pin Force Sensors>

A pin 43, which connects the arm 12 and bucket 23 together, and a pin 44, which connects the link 16 and bucket 23 together, are provided with pin force sensors 43*a*, 44*a*, respectively. As the pin force sensors 43*a*, 44*a*, strain gauges are inserted, for example, in cylindrical bores. By measuring strains produced on the strain gauges, the magnitudes and directions of forces (external forces) applied to the pins 43,44 are detected.

<Setting of Coordinate System>

Figure 4:
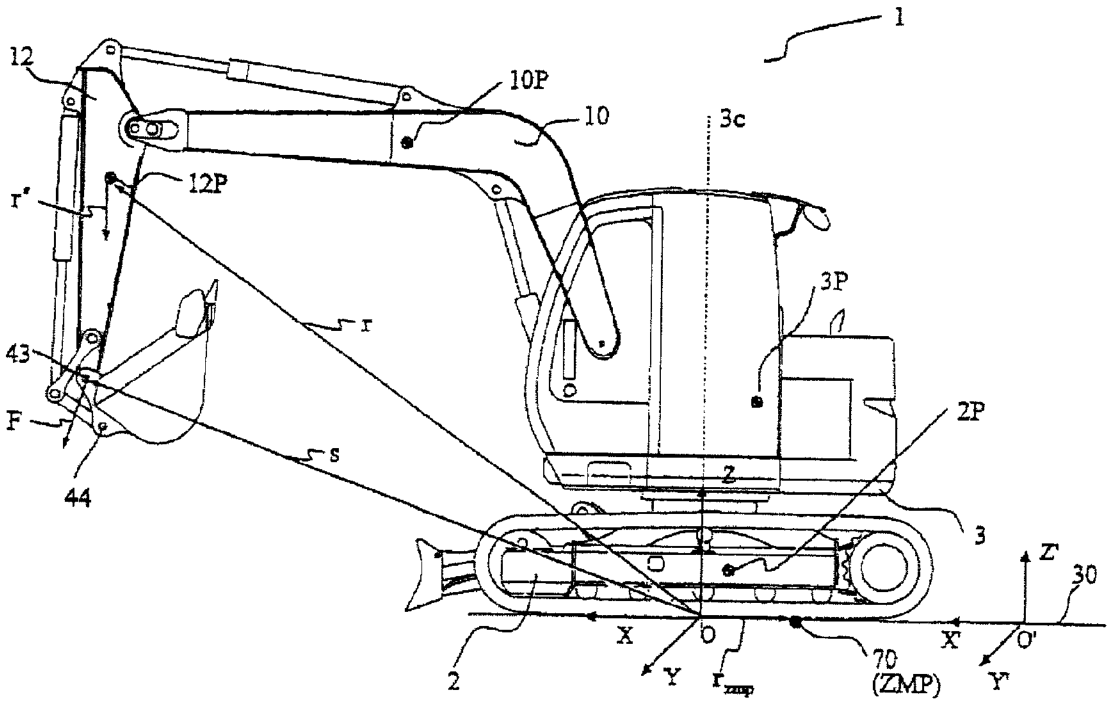
FIG. 4 is a side view depicting a ZMP-computing model of a working machine according to the first embodiment.

FIG. 4 depicts a ZMP-calculating model of the working machine (in side view), a world coordinate system (O-X'Y'Z'), and a machine reference coordinate system (O-XYZ). As depicted in FIG. 4, the world coordinate system (O-X'Y'Z') uses the direction of the gravity as a reference, and also uses, as a Z-axis, a direction opposite to the gravity. On the other hand, the machine reference coordinate system (O-XYZ) uses the undercarriage 2 as a reference. As depicted in FIG. 4, its origin is set at a point O which is located on the center line 3*c* of rotation of the upperstructure 3 and is in contact with the ground surface 30, and its X-axis, Y-axis and Z-axis are set in a longitudinal direction and lateral direction of the undercarriage 2 and in the direction of the center line 3*c* of rotation, respectively. A relationship between the world coordinate system and the machine reference coordinate system is detected using the above-mentioned posture sensors, and at the ZMP calculating means 60*f*, computation is performed in the machine reference coordinate.

<Model>

In the first embodiment, a lumped mass model in which respective structural members have their masses lumping at their centers of gravity is used as a model for computing a ZMP 70 in view of the simplicity of assembly. Mass points 2P,3P,10P,12P of the undercarriage 2, upperstructure 3, boom 10 and arm 12 are set at the barycentric positions of the respective structural members, and the masses at the respective mass points are assumed to be m2,m3,m10,m12, respectively. In addition, the position vectors at the respective mass points are assumed to be r2,r3,r10,r12, and the acceleration vectors at the respective mass points are assumed to be r"2, r"3,r"10,r"12, respectively.

It is to be noted that the setting method of mass points is not limited to the above-described one and, for example, positions at which masses lump (the engine 5, counterweight 8 and the like, which are shown in FIG. 1) may be added.

When work is performed by the bucket 23, an external force is applied to a tip of the bucket 23. As the bucket 23 is connected to the front working mechanism 6 via the pins 43,44, the gravity and inertia force of the bucket 23 and external forces applied in the direction of the X-axis and the direction of the Z-axis to the bucket 23 are all calculated as external vectors F43 and F44 applied to the pin 43 and pin 44 to compute the coordinates of the ZMP. Now, the position vectors at the pin 43 and pin 44 as acting points of external forces are assumed to be s43,s44.

<Stability Evaluation Index>

Before describing details of the respective elements of the safety system, a description is now made about an evaluation method of stability in the present invention. In the first embodiment, a ZMP (Zero Moment Point) is used as a stability evaluation index for the determination of the stability of the working machine 1.

A ZMP stability discrimination criterion is based on the d'Alembert's principle. The concept of ZMP and ZMP stability discrimination criterion are described in Miomir Vukobratovic: "LEGGED LOCOMOTION ROBOTS" (translated into Japanese by Ichiro KATO: "HOKOU ROBOTTO To JINKOU NOASHI (LEGGED LOCOMOTON ROBOTS AND ARTIFICIAL LEGS)" by Nikkan Kogyo Shimbunsha).

From the working machine 1 shown in FIG. 1 onto the ground surface 30, a gravity, an inertia force, an external force and their moment act. According to the d'Alembert's principle, they are balanced with ground reaction forces and ground reaction moments as counteraction from the ground surface 30 to the working machine 1.

When the working machine 1 is in stable contact with the ground surface 30, a point (ZMP) where moments in the directions of pitch axis and roll axis become zero, therefore, exists on one of sides of or inside a support polygon formed by connecting points of contact between the working machine 1 and the ground surface 30 such that no concave shape is allowed. Conversely speaking, when the ZMP exists in the support polygon and the force acting from the working machine 1 onto the ground surface 30 is in a pressing direction against the ground surface 30, in other words, the ground reaction force is positive, the working machine 1 can be considered to be in stable contact with the ground.

Specifically speaking, the stability is higher as the ZMP is closer to the center of the support polygon, and the working machine 1 can perform work without tipping when the ZMP is located inside the support polygon. When the ZMP exists on the support polygon, on the other hand, the working machine 1 has a potential risk that it may start tipping. It is, therefore, possible to determine the stability by comparing the ZMP with the support polygon formed by the working machine 1 and ground surface 30.

<ZMP Equation>

Based on the balance among moments produced by the gravity, inertia force and external force, a ZMP equation can be derived as follows:

$$\sum_i m_i(r_i - r_{zmp}) \times r_i'' - \sum_j M_j - \sum_k (s_k - r_{zmp}) \times F_k = 0 \quad (1)$$

where, $r_{zmp}$: ZMP position vector, $m_i$: mass at an $i^{th}$ mass point, $r_i$: position vector at the $i^{th}$ mass point, $r''_i$: acceleration vector (including gravitational acceleration) applied to the $i^{th}$ mass point, $M_j$: $j^{th}$ external moment, sk: position vector at the $k^{th}$ acting point of external force, Fk: $k^{th}$ external force vector It is to be noted that each vector is a three-dimensional vector having an X-component, Y-component and Z-component.

The first term in the left side of the above equation (1) represents the sum of moments (radii: $r_i - r_{zmp}$) about the ZMP 70 (see FIG. 3), which are produced by acceleration components (which include gravitational accelerations) applied at the respective mass points $m_i$. The second term in the left side of the above equation (1) represents the sum of external moments $M_j$ acting on the working machine 1. The third term in the left side of the above equation (1) represents the sum of moments (radii: $sk - r_{zmp}$) about the ZMP 70, which are produced by external forces $F_k$ (the acting point of the $k^{th}$ external force vector $F_k$ is represented by sk).

The equation (1) describes that the sum of the moments (radii: $r_i - r_{zmp}$) about the ZMP 70, which are produced by the acceleration components (which include gravitational acceleration) applied at the respective mass points $m_i$, the sum of external moments $M_j$, and the sum of the moments (radii: $sk - r_{zmp}$) about the ZMP 70, which are produced by the external forces $F_k$ (the acting point of the $k^{th}$ external vector $F_k$ is represented by sk), are balancing.

The ZMP 70 on the ground surface 30 can be calculated by the ZMP equation expressed as equation (1).

When the object is at rest and only the gravity is acting, the ZMP equation can be expressed as:

$$\sum_i m_i(r_i - r_{zmp}) \times g = 0 \quad (2)$$

by using a gravitational acceleration vector g, and therefore, the ZMP coincides with a projected point of the static center of gravity on the ground surface. The ZMP can, accordingly, be dealt with as the projected point of the center of gravity with a dynamic state and a static state being taken in consideration, and the use of the ZMP as an index makes it possible to commonly deal with both cases where an object is at rest and where the object is undergoing a motion.

Further, the support polygon coincides with the shape of a ground contact area of the working machine, and therefore, can show a region, in which stability is assured, and the current stability (the ZMP position in the support polygon) on a top plan view of the contour of the working machine as projected onto the ground surface and is visually apparent.

<User Setting Input Means>

In FIG. 1, the user setting input means 55 is comprised of plural input buttons or the like, and the operator performs via the user setting input means 55 the setting of a warning method, a safety factor and the like according to the details of work and his or her own preference.

<ZMP Calculating Means>

The ZMP calculating means **60*f* is comprised of the linkage computing means 60*a* and ZMP computing means 60*b*. The linkage computing means 60*a* calculates, from detection values of the state quantity sensing means 49, the position vector, acceleration vector and external force vector at each mass point based on the machine reference coordinate system (O-XYZ). The ZMP computing means 60*b* calculates a ZMP 70*a*** by using the position vector, acceleration vector and external force vector at each mass point as converted to the machine reference coordinate system.

<Linkage Computation>

Detection values of the posture sensor **3*b*, swing angle sensor 3*s*, boom angle sensor 40*a*, arm angle sensor 41*a*, bucket angle sensor 42*a*, undercarriage acceleration sensor 2*a*, upperstructure acceleration sensor 3*a*, boom acceleration sensor 10*a*, arm acceleration sensor 12*a* and pin force sensors 43*a*,44*a*, which are arranged at the various parts of the working machine 1 in FIG. 3, are sent to the linkage computing means 60*a* in the ZMP calculating means 60*f***.

At the linkage computing means **60*a*, forward kinematics calculations are performed with respect to the respective linkages by using a value of the posture sensor 3*b* arranged on the upperstructure 3 shown in FIG. 3 and detection values of the swing angle sensor 3*s*, boom angle sensor 40*a*, arm angle sensor 41*a* and bucket angle sensor 42*a* arranged at the various parts of the working machine 1. The position vectors r2,r3,r10,r12 at the respective mass points 2P,3P,10P,12P shown in FIG. 4, the acceleration vectors r"2,r"3,r"10,r"12 at the respective mass points as calculated from the results of detection at the undercarriage acceleration sensor 2*a*, upperstructure acceleration sensor 3*a*, boom acceleration sensor 10*a* and arm acceleration sensor 12*a*, the position vectors s43, s44 acting on the pins 43,44, and the respective external force vectors F43, F44 acting on the pins 43,44 are then converted to values based on the machine reference coordinate system (O-XYZ). It is to be noted that as a method for the kinematic calculations, a known method, for example, the method described in YOSHIKAWA, Tsuneo: "Robotto Seigyo Kiso-ron (Fundamentals of Robot Control)", in Japanese, Corona Publishing Co., Ltd. (1988) can be used. Data to be sent from the linkage computing means 60*a* to the ZMP computing means 60*b*** include the position vector, acceleration vector and external force vector at each mass point based on the machine reference coordinate system (O-XYZ).

<ZMP Computation>

At the ZMP computing means **60*b*, the ZMP 70*a* is calculated by using the position vectors, acceleration vectors and external force vectors at the respective mass points, said vectors having been converted to the machine reference coordinate system, and is outputted as the ZMP position 70**.

Assuming that the z-axis coordinate of the ZMP is located on the ground surface 30 in the first embodiment because the origin O of the machine reference coordinate system is set at the point where the undercarriage 2 and ground surface 30 are in contact to each other, $r_{zmpz}=0$. Further, no substantial external force or external force moment generally acts on parts other than the bucket 23 in the working machine 1. By hence ignoring effects of external forces or external force moments acting on the parts other than the bucket 23, the external moment M is deemed to be 0 (M=0). By solving the equation (1) under such conditions, the X-coordinate $r_{zmpx}$ of the ZMP **70*a*** is calculated as follows:

$$r_{zmpx} = \frac{\sum_i m_i(r_{iz}r''_{ix} - r_{ix}r''_{iz}) - \sum_k (s_{kz}f_{kx} - s_{kx}F_{kz})}{\sum_i m_i r''_{iz} - \sum_k F_{kz}} \tag{3}$$

Likewise, the Y-coordinate $r_{zmpy}$ of the ZMP 70*a* is calculated as follows:

$$r_{zmpy} = \frac{\sum_i m_i(r_{iy}r''_{iz} - r_{iz}r''_{iy}) - \sum_k (s_{ky}F_{kz} - s_{kz}F_{ky})}{\sum_i m_i r''_{iz} - \sum_k F_{kz}} \tag{4}$$

In the equations (3) and (4), m is the mass at each mass point 2P, 3P, 10P or 12P shown in FIG. 4, and the masses m2,m3,m10,m12 at the respective mass points are substituted for m. r" is an acceleration at each mass point, and the accelerations r"2,r"3,r"10,r"12 are substituted for r". s indicates a position vector at each of the pins 43,44, and s43,s44 are substituted for s. F represents an external force vector applied to each of the pins 43,44 as the acting points of external forces, and F43,F44 are substituted for F.

As has been described above, the ZMP computing means 60*b* can calculate the coordinates of the ZMP 70*a* by using the detection values of the respective sensors arranged at the various parts of the working machine 1. The calculated ZMP 70*a* is sent as the ZMP position 70 to the stability computing means 60*d* and ZMP storing means 60*g*.

<ZMP Storing Means>

The ZMP storing means 60*g* stores the ZMP position 70, which has been calculated at the ZMP calculating means 60*f*, as a ZMP position record 72 for a predetermined time period, and discards the data upon elapse of the predetermined time period.

<Stability Computing Means>

Using FIGS. 5(*a*) and 5(*b*), a description will next be made about the calculation of stability and the determination of a risk of tipping, which the stability computing means 60*d* performs based on the ZMP position 70.

When the ZMP position 70 exists in a region sufficiently inside a support polygon L formed by the working machine 1 and ground surface 30 as described above, the working machine 1 shown in FIG. 1 can safely perform work substantially without a risk of tipping.

Figure 5A:
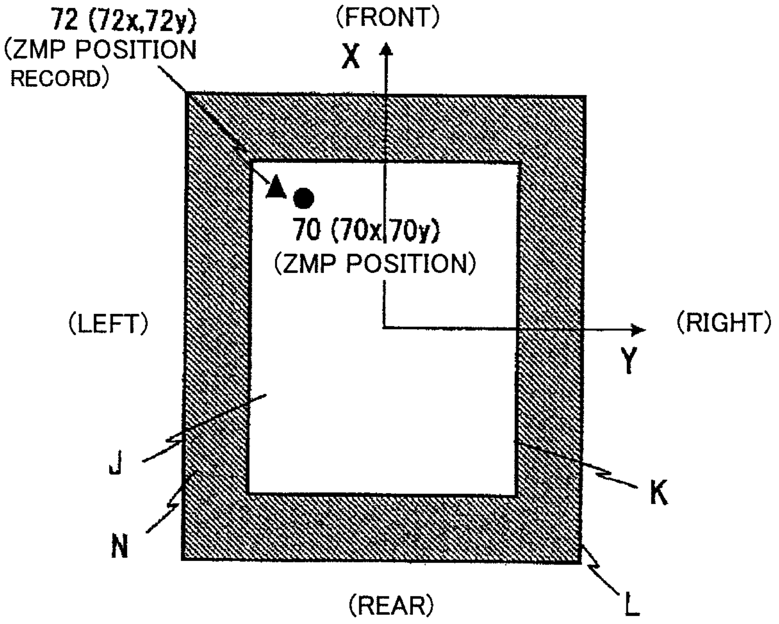
FIGS. 5(*a*) and 5(*b*) are schematic diagrams illustrating a support polygon and tipping warning region(s) according to the first embodiment.
Figure 5B:
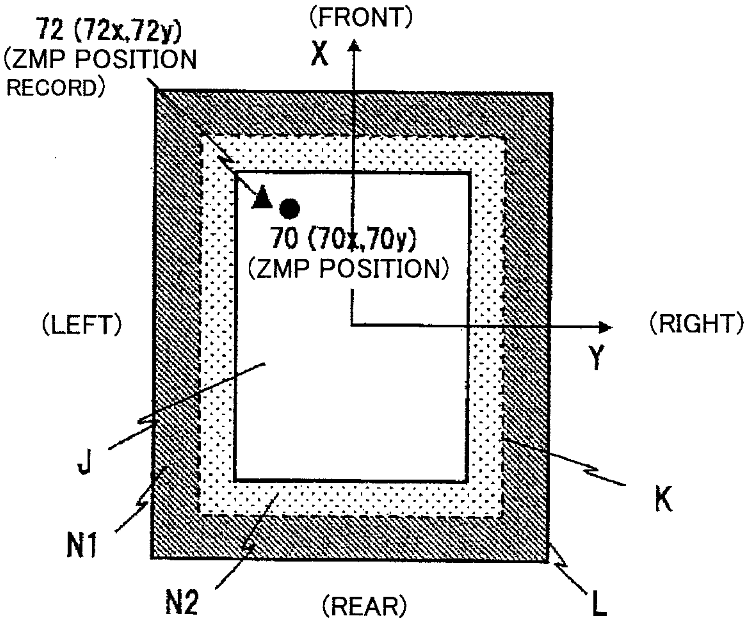

The stability computing means 60*d* in the first embodiment is comprised of a support polygon calculating means 60*m* and a stability evaluating means 60*n* as illustrated in FIG. 5(*a*). The support polygon calculating means 60*m* calculates the support polygon L formed by the ground contact points of the working machine 1 with the ground surface 30, and the stability evaluating means 60*n* sets a normal region J, where the risk of tipping is sufficiently low, and a tipping warning region N, where the risk of tipping is higher, in the support polygon L calculated by the support polygon calculating means 60*m*, and evaluates the stability based on a determination as to in which one of the regions the ZMP position 70 is located.

When the working machine 1 is located upright on the ground surface 30, the support polygon L is substantially the same as the planar shape of the undercarriage 2. When the planar shape of the undercarriage 2 is rectangular, the support polygon L, therefore, becomes rectangular as illustrated in FIG. 5(*a*). More specifically, when the working machine 1 has crawlers as the undercarriage 2, the support polygon L is in a quadrilateral shape having, as a front boundary, a line connecting central points of left and right sprockets, as a rear boundary, a line connecting central points of left and right idlers, and as left and right boundaries, right and left outer side edges of respective track links. It is to be noted that the front and rear boundaries can be the ground contact points of frontmost lower rollers and the ground contact points of rearmost lower rollers, respectively.

On the other hand, the working machine 1 illustrated in FIG. 1 has a blade 18. When the blade 18 is in contact with the ground surface 30, the support polygon L expands to include a bottom part of the blade. In a jack-up operation that the bucket 23 is pressed against the ground surface to lift up the undercarriage 2, on the other hand, the support polygon L takes a polygonal shape formed by two end points on a side, where the undercarriage 2 is in contact with the ground, and a ground contact point of the bucket 23. Because the shape of the support polygon L discontinuously changes depending on the state of contact of the working machine 1 with the ground as described, the support polygon calculating means 60*m* monitors the state of contact of the working machine 1 with the ground, and sets the support polygon L according to the state of its contact with the ground.

At the stability evaluating means 60*n*, a boundary K between the normal region J and the tipping warning region N is set inside the support polygon L. Described specifically, the boundary K is set as a polygon contracted toward a central point at a ratio determined according to a safety factor, or as a polygon moved inward by a length determined according to the safety factor.

When the ZMP position 70 calculated at the ZMP calculating means 60*f* is in the normal region J, the stability evaluating means 60*n* determines that the stability of the working machine 1 is sufficiently high. When the ZMP position 70 is in the tipping warning region N, on the other hand, the stability evaluating means 60*n* determines that the working machine has a risk of tipping.

As this embodiment is configured to produce a warning when the ZMP position 70 is in the tipping warning region N, the warning is produced earlier as the area of the tipping warning region N increases. The size of the tipping warning region N can, therefore, be determined in view of safety or the like required for the working machine 1. It is to be noted that the safety factor may be a desired value (for example, 80%) set beforehand or may be a value to be changed depending on the proficiency level of the operator who operates the working machine 1, work details, road surface, surrounding circumstances and the like. In this case, it may be contemplated to automatically set the safety factor from information given beforehand, output values of various sensors, or the like, or to allow an operator or work supervisor to set the safety factor as desired by using the user setting input device 55.

It may be configure such that the safety factor may be changed during work depending on the operating conditions of the working machine 1 or safety factors of different values may be used for the front, rear, left and right, respectively. In work on a sloping ground, for example, the ZMP position 70 is prone to move toward the downhill side on a tilted surface so that tipping tends to occur more easily toward the downhill side than the uphill side. The tipping warning region N is, therefore, set to become wider on the downhill side depending on the tilt as illustrated in FIG. 5. It may be contemplated to use, as the tilt, an input by the operator or a detection value of the posture sensor 3*b*. In case of occurrence of tipping, tipping in a direction other than the direction in which the front working mechanism 6 exists tends to result in a more serious accident compared with tipping in the direction toward the front working mechanism 6. In view of the direction of the front working mechanism 6, the tipping warning region N is, therefore, set such that it becomes wider in the directions other than the direction of the front working mechanism 6. It may be contemplated to detect, by the swing angle sensor 3*s*, the direction of the front working mechanism 6 relative to the support polygon L.

As a method for setting the tipping warning region N, it is contemplated to manually change the setting as needed by the operator or work supervisor or to use a GPS, map information, a CAD drawing of the work, or the like. The use of the above-described information makes it possible to automatically discriminate a direction where tipping tends to occur or a direction where a damage is large if tipped and to automatically change the boundary K between the normal region J and the tipping warning region N such that the tipping warning region N becomes broader in such a direction.

By setting the safety factor at an appropriate value as described above, safe work can be performed without a reduction in work efficiency.

To assure higher safety, the stability evaluating means 60*n* may be configured such that the ZMP position record 72 stored in the ZMP storing means 60*g* is used and a risk of tipping is determined to exist when even one of the ZMP position 70 and ZMP position record 72 is in the tipping warning region N. Described specifically, the operator is difficult to grasp, point by point, varying information in such work that the ZMP position varies in a relatively short time, and therefore, history information over several seconds or so is recorded and a determination is made based on the history information.

To decrease a reduction in work efficiency due to a surfeit of warnings and also to assist a stability restoring operation by the operator, it may also be configured to determine the need of a warning from the positional relation between the ZMP position 70 and the ZMP position record 72.

Figure 6:
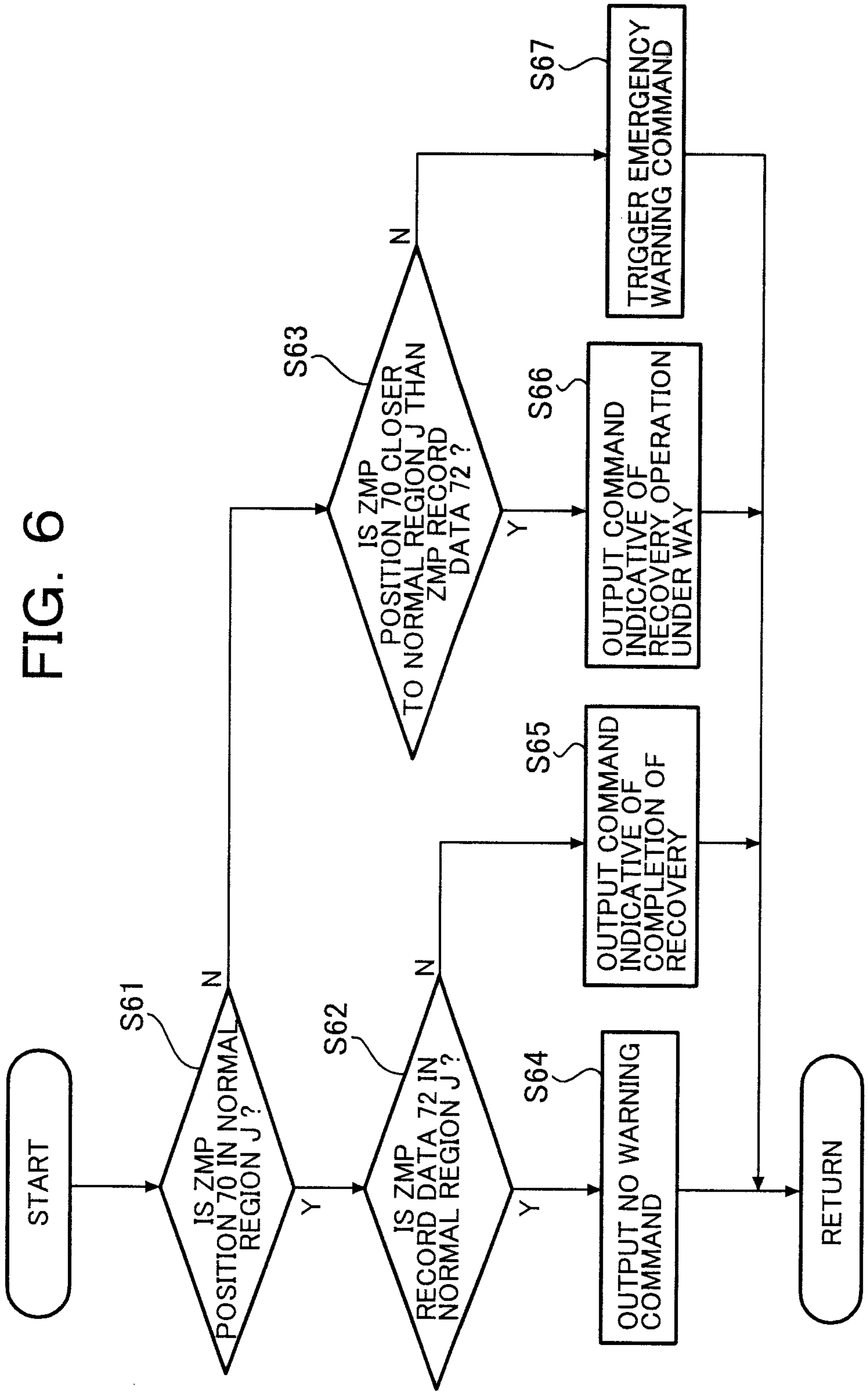
FIG. 6 is a flow chart illustrating one example of a determination method by a stability computing means according to the first embodiment.

About specific determination and warning methods of a risk of tipping, a description will be made using the flow chart of FIG. 6. When the ZMP position 70 and ZMP position record 72 are both in the normal region J, the working machine 1 is determined to be sufficiently stable and no warning command is outputted (steps 61,62,64). When the ZMP position 70 is in the normal region J and the ZMP record data 72 is in the tipping warning region N, recovery from a low-stability state is determined to have been completed, and a command indicative of the completion of recovery is outputted (steps 61,62,65). When the ZMP position 70 is in the tipping warning region N, a command is changed depending on the positional relation between the ZMP position 70 and the ZMP record data 72. A recovery operation is considered to be in the middle of being attempted, when the ZMP position 70 is closer to the normal region J than the ZMP position record 72. However, the working machine is still in a state of having a risk of tipping and the recovery from the low-stability state has not been completed. Therefore, a command indicative of a recovery operation under way is outputted (steps 61,63,66). When the ZMP position 70 is in the tipping warning region N and is closer to one of the sides of the support polygon L than the ZMP position record 72, there is an increased risk of tipping so that the need for a warning is very high. In this case, an emergency warning command is hence triggered (steps 61,63,67).

By using the ZMP position record 72 as a further evaluation index in addition to the ZMP position 70 as described above, it is possible to determine whether the current operation of the working machine 1 is a stability recovering operation or a stability reducing operation. Safe work can, therefore, be assisted by a more appropriate command. It is also possible to determine a case where the recovery of stability is promised, and accordingly, to change the warning method. Therefore, a discomfort or a reduction in work efficiency due to a surfeit of warnings can be avoided.

Concerning the boundary K between the normal region J and the tipping warning region N, it may be configured to set two or more boundaries stepwise such that the tipping warning region N are divided into two or more regions as illustrated in FIG. 5(*b*). When the tipping warning region N is divided into a tipping warning region N1 and tipping warning region N2 as illustrated in FIG. 5(*b*), it is possible to avoid a risk at an early stage by issuing a command to produce a preliminary warning, for example, when the ZMP position 70 is in the tipping warning region N2.

Figure 7A:
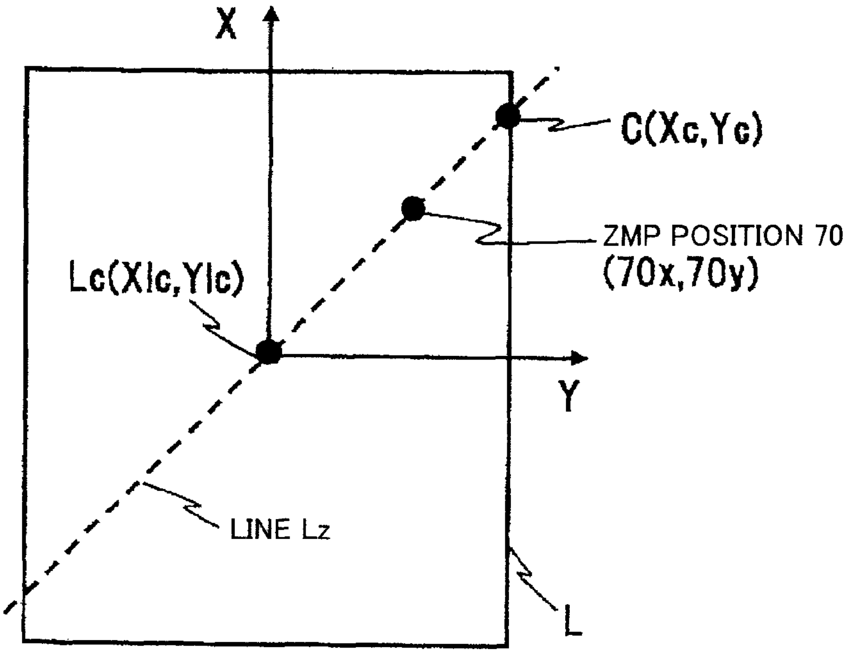
FIGS. 7(*a*) and 7(*b*) are schematic diagrams respectively illustrating stability calculating methods according to the first embodiment.
Figure 7B:
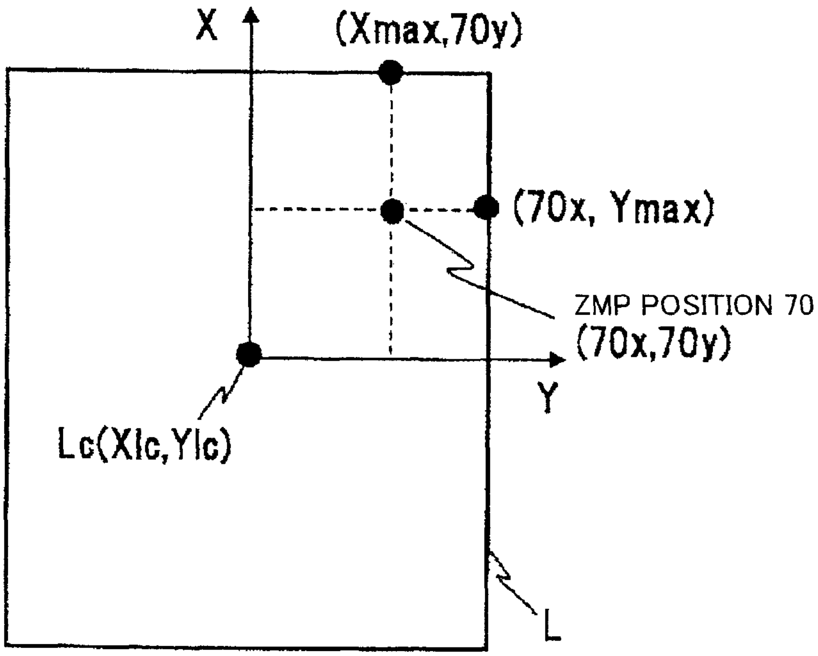

FIGS. 7(*a*) and 7(*b*) are diagrams illustrating a method that at the stability evaluating means 60*n*, the stability is calculated in numerical terms and is determined in addition to the determination of a risk of tipping by the determination of a region.

The use of this method makes it possible to quantitatively and continuously grasp the stability. A description will be made taking, as an example, a case where a support polygon is rectangular. A line Lz, which passes through a center Lc (Xlc,Ylc) of the support polygon L and the ZMP position 70, and an intersection point C (Xc,Yc) between the line Lz and one of the sides of the support polygon are calculated. Using the ratio of the distance from the center Lc to the ZMP position 70 to the distance from the center Lc to the intersection point C, the level of stability α is defined by:

$$\alpha = 1 - \frac{\sqrt{(r_{zmpx} - Xlc)^2 + (r_{zmpy} - Ylc)^2}}{\sqrt{(Xc - Xlc)^2 + (Yc - Ylc)^2}} \tag{5}$$

(see FIG. 7(*a*)). The level of stability α takes a value between from 0 to 1, and a greater value indicates that the ZMP position is closer to the center of the support polygon and means that the stability is higher.

To permit simper computation, the level of stability α may be defined to be one that evaluates the ratios of maximum values, which can be taken as an X coordinate and Y coordinate in the support polygon, to the ZMP position 70 (see FIG. 7(*b*)). Here, the smaller value out of the ratio in the direction of the X-axis:

$$\alpha x = 1 - \frac{|r_{zmpx} - Xlc|}{|X\max - Xlc|} \tag{6}$$

and the ratio in the direction of the Y-axis:

$$\alpha y = 1 - \frac{|r_{zmpx} - Ylc|}{|Y\max - Ylc|} \tag{7}$$

is chosen as the level of stability α. In the above-described equations, Xmax is the maximum value of the X coordinate, which can be taken in the support polygon, while Ymax is the maximum value of the Y coordinate, which can be taken in the support polygon. Described in the foregoing is the method that calculates the level of stability by using the ratio of the distance from the center of the support polygon to the ZMP position to the distance from the center of the support polygon to the one side of the support polygon. As an alternative, the distance ratio may be evaluated in logarithm to calculate the level of stability. By doing so, variations in stability in the neighborhood of the support polygon can be expressed in more detail.

When the stability is determined to be sufficiently high, the stability evaluating means 60*n* outputs the ZMP position 70, the ZMP position record 72 and the level of stability α to the display and warning means. When a risk of tipping is determined to exist, the stability evaluating means 60*n* outputs a warning command in addition to the ZMP position 70, the ZMP position record 72 and the level of stability α.

<Display>

A display means 61 is comprised of the display control means 61*c* and display 61*d*. The display control means 61*c* determines the contents of a display by a command from the stability computing means 60*d*. The display 61*d* is a device comprised of a cathode ray tube, liquid crystal panel or the like, is arranged in the operator's cab 4, and displays stability information and a risk of tipping under control from the stability computing means 60*d*.

Figure 8A:
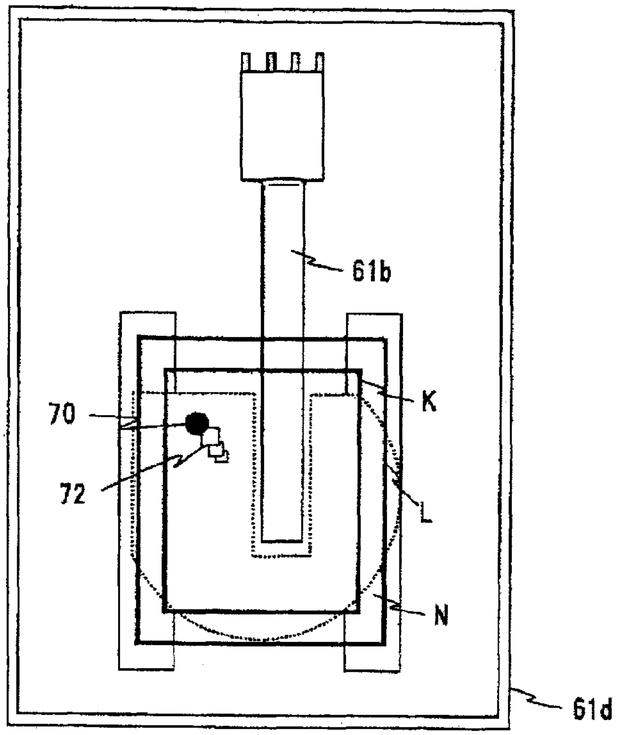
FIGS. 8(*a*) and 8(*b*) are illustration diagrams respectively showing examples of a display according to the first embodiment.
Figure 8A:
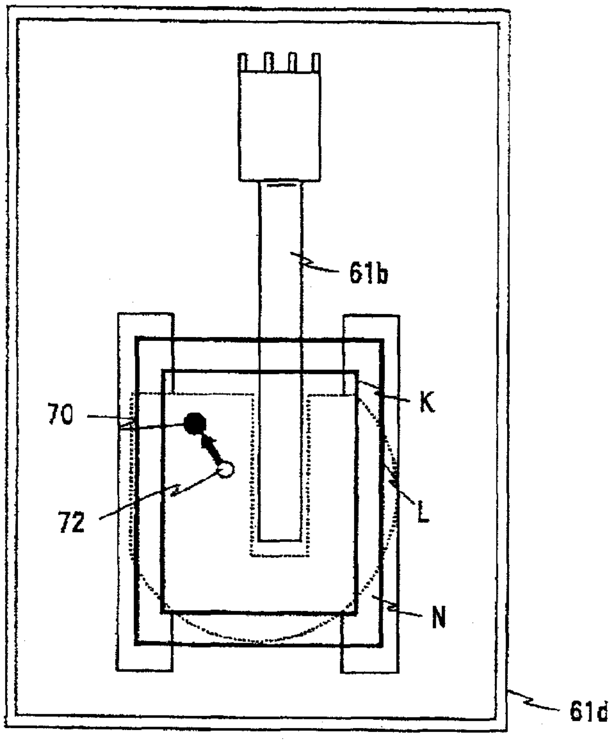

As shown in FIGS. 8(*a*) and 8(*b*), a top plan view 61*b* of the working machine 1 is displayed on the display 61*d*, and on the top plan view 61*b*, the tipping warning region N, ZMP position 70 and ZMP position record 72 are displayed. Upon displaying the ZMP position record 72, it may be configured to use a shape and color different from those of the ZMP position 70 as shown in FIG. 8(*a*), or to display old data smaller than new data. When there are plural ZMP position records, only the value of the lowest stability may be displayed, or the plural ZMP position records may be displayed after thinning them out to an adequate extent. As an alternative, it may be configured to display an arrow mark from the ZMP position record 72 to the ZMP position 70 as shown in FIG. 8(*b*).

Figure 9:
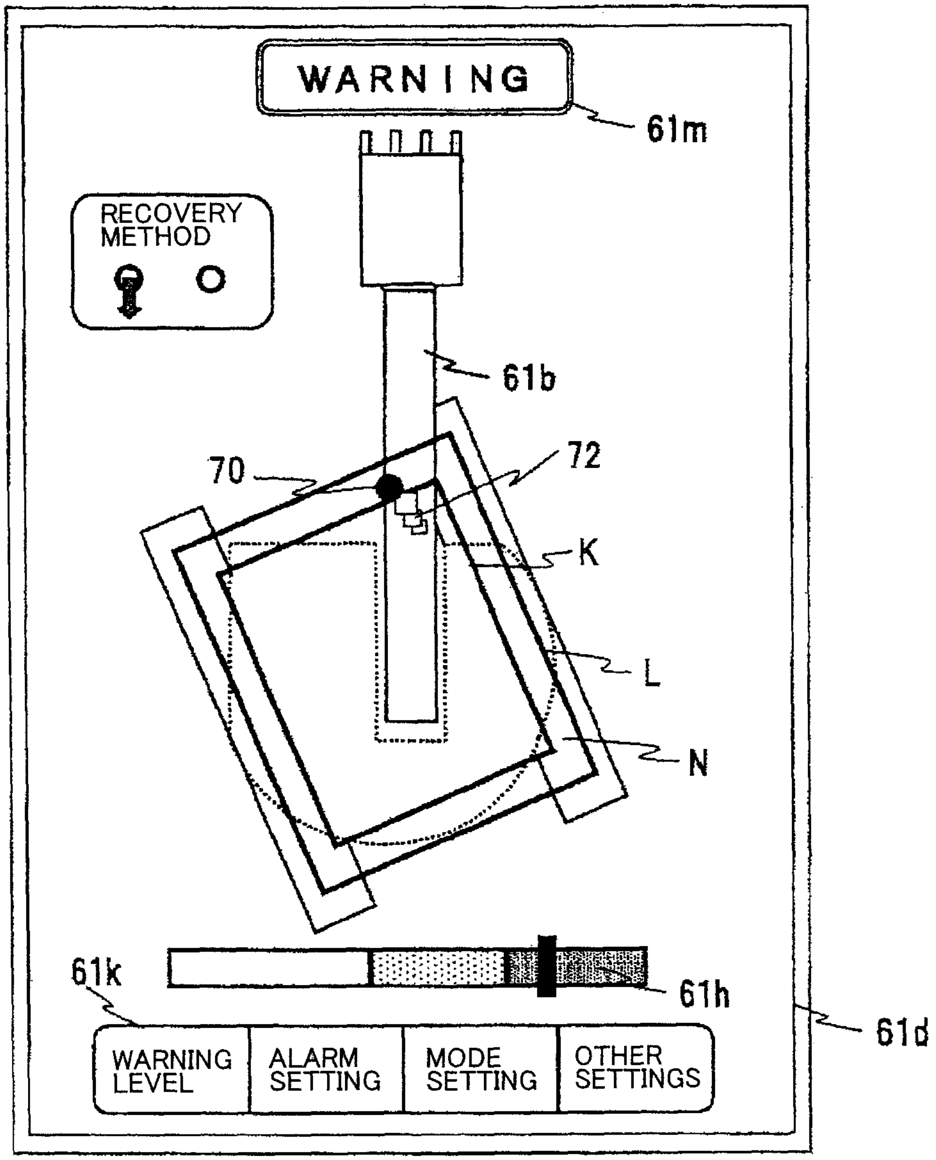
FIG. 9 is an illustration diagram showing a further example of the display according to the first embodiment.

The level of stability α calculated at the stability computing means 60*d* is displayed by using a bar 61*h* as shown in FIG. 9. In the example shown in FIG. 9, the bar 61*h* that indicates the level of stability α is arranged in a lower part of the display 61*d* and an indicator moves rightward as the level of stability becomes lower. However, the bar may be displayed such that the indicator moves in an up-and-down direction according to the level of stability, and further, the place where the bar 61*h* is displayed may be set in an upper part, left part or right part of the display 61*d*.

Upon swinging, the undercarriage 2 in the top plan view 61*b* is displayed by rotating it in a reverse direction over a swing angle with respect to the upperstructure 3 as shown in FIG. 9. By diagrammatically illustrating a swing posture as described above, the front of the operator's field vision and the top part of the display 61*d* can also be kept in registration, and further, the recognition of a traveling direction is facilitated.

Figure 10A:
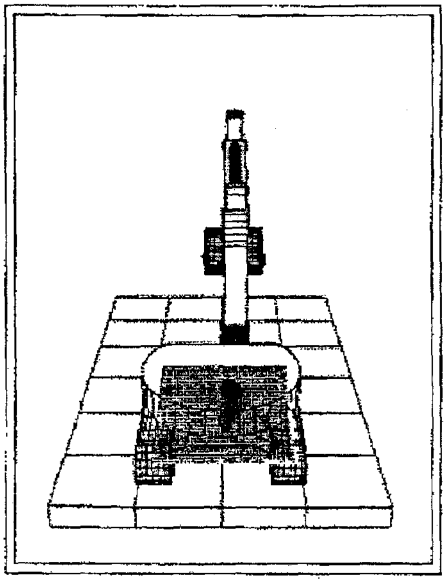
FIGS. 10(*a*) to 10(*c*) are illustration diagrams respectively showing still further examples of the display according to the first embodiment.
Figure 10B:
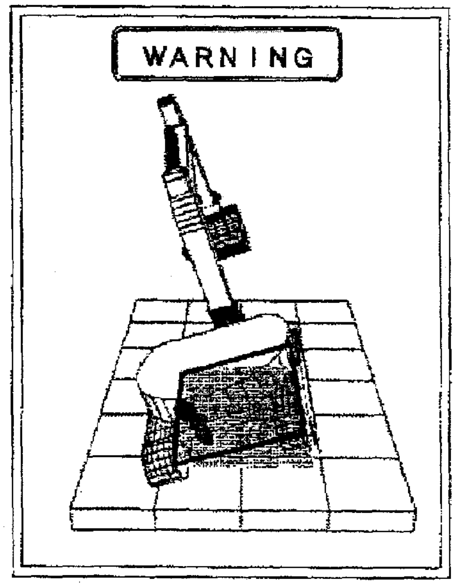
Figure 10C:
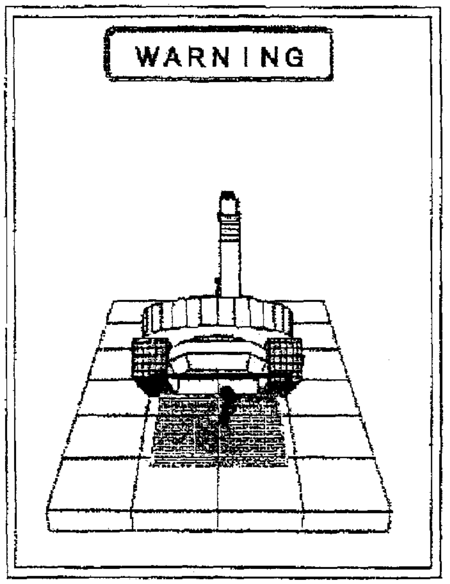

The display 61*d* warns a risk of tipping by a command from the stability computing means 60*d*. A warning message 61*m*, which makes use of letters or an illustrated view, is displayed in the upper part or lower part of the display 61*d*. Further, as shown in FIGS. 10(*a*) to 10(*c*), an illustrated three-dimensional view that shows a simplified view of the working machine 1 may be displayed instead of the top plan view 61*b* and, when there is a risk of tipping, a display may be made to indicate a process of tipping, for example, by tilting the three-dimensional illustration. As another warning method of a risk of tipping, the background color of the display 61*d* is changed when there is a risk of tipping. For example, a white color is used as a background color for normal times (stable states), and upon issuance of a warning, the background color is changed to a red color.

The use of the level of stability α also makes it possible to configure such that the background color is changed in several stages. For example, the background color may be set to a white color at a normal time, to a yellow color when the level of stability α is slightly low, to an orange color as the level of stability α becomes lower, and to a red color upon issuance of a warning command. By changing the background color as described above, the operator can instantaneously grasp a risk of tipping without keeping a close watch on the display screen. Although certain illustrative changes of the background color of the display have been indicated above, the display colors of the tipping warning region N, ZMP position 70 and ZMP position record 72 may be changed like the background color.

The display 61*d* may be configured to also serve as the user setting input means 55 for allowing the operator to perform setting of a warning level, an alarm and the like. In this case, the display 61*d* is configured to include an input means such as a touch panel, and performs a display of setting input ions 61*k* as shown in FIG. 9.

<Warning Means>

In the working machine 1 according to the first embodiment, a warning means for producing a warning according to the level of stability α is arranged. The warning means 63 is comprised of the warning control means 63*c* and warning device 63*d*. The warning control means 63*c* determines and outputs a warning method based on a command from the stability computing means 60*d*. The warning device 63*d* is a device such as, for example, a buzzer, that produces a warning sound and produces a warning such as a warning sound by a command from the warning control means 63C. The warning device 63*d* is arranged in the operator's cab 4. The warning control means 63*c* triggers a command such that the warning sound is changed according to the level of stability α. For example, the warning control means 63*c* performs a change such as increasing the loudness of a sound as the level of stability α becomes lower, making the interval between warning sounds shorter as the level of stability α becomes lower, or changing the tone of the warning sound according to the level of stability α.

By allowing the operator or adjacent workers to become aware of any risk of tipping with a warning produced by the warning device 63*d* arranged in the operator's cab 4, work of high stability can be performed. By changing the warning sound according to the level of stability, the operator is allowed to accurately recognize the stability even when he or she is not watching the display 61*d*.

An additional warning device 63*d* may also be arranged outside the working machine 1. The adoption of such a configuration makes it possible to inform workers, who are working around the working machine 1, of a risk of tipping of the working machine 1.

<Change to the Display of Swing Operation>

Figure 11:
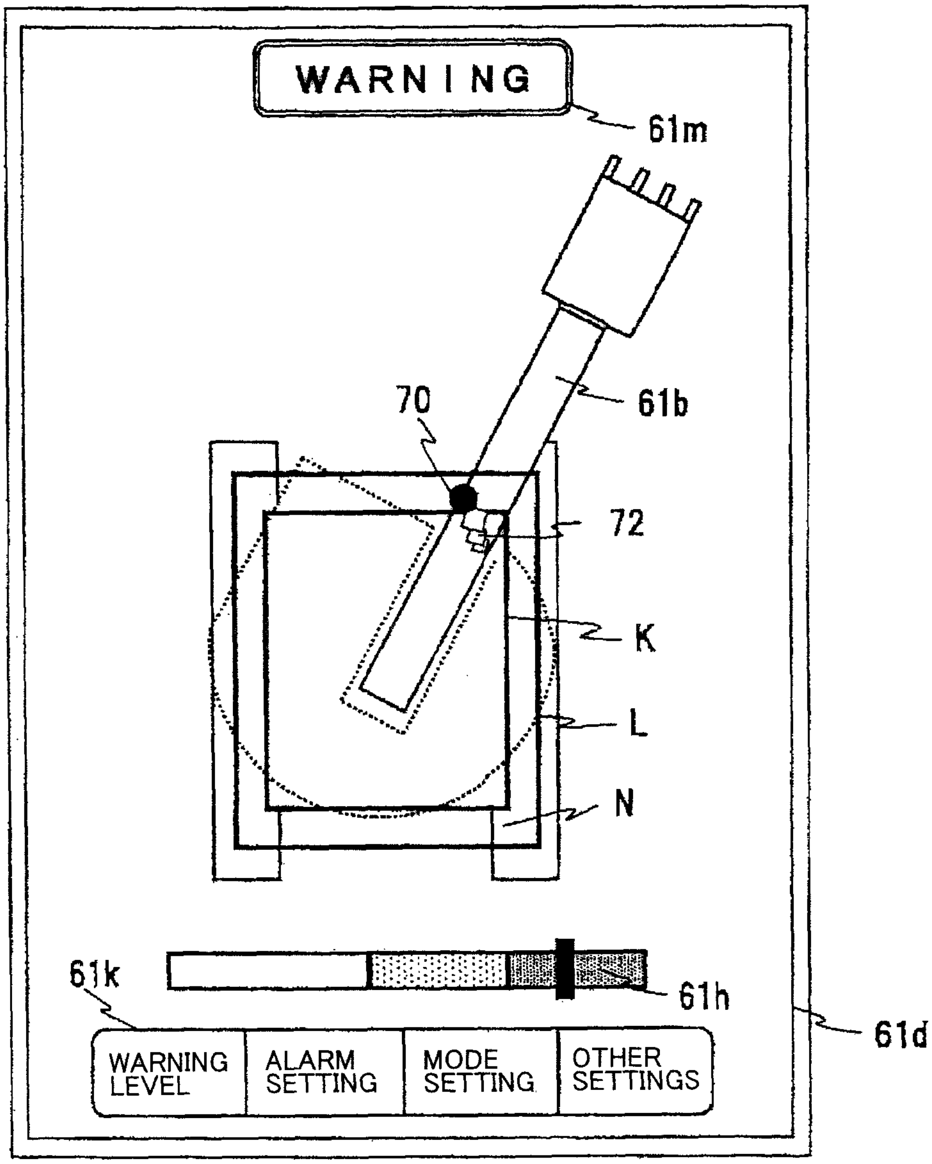
FIG. 11 is an illustration diagram showing a yet still further example of the display according to the first embodiment.

In the example shown in FIG. 9, the undercarriage 2 in the top plan view is displayed by rotating it in the reverse direction over the swing angle with respect to the upperstructure 3, and the front working mechanism is always kept to direct upward on the display. As shown in FIG. 11, however, it may also be configured to perform a display by fixing the direction of the undercarriage 2 in the top plan view and rotating the upperstructure 3 over the swing angle with respect to the undercarriage 2. This display method is particularly effective when there is a need to grasp the positional relations with surrounding objects.

<Locations of Display and Warning Means>

In the above examples, the description was made under the assumption that the operator sits in the operator's seat 4 arranged on the working machine 1 and performs the control of the working machine 1. On the other hand, there is a case in which the control of the working machine 1 is performed by a remote control that makes use of wireless transmission or the like. At the time of a remote control, it is difficult to accurately grasp the posture of the working machine, the tilt of a road surface and the like compared with the time that an operator is in the operator's cab. Further, it is difficult even for a skilled operator to get a sensory grasp of the stability of the working machine. The display of stability information and the warning for the operator can, therefore, bring about still greater advantageous effects at the time of a remote control.

In the remote-controlled working machine, the control levers are generally arranged at a control site for the operator other than on the working machine 1. The display device and warning device can also be arranged at the site where the operator performs controls. By performing computation for the calculation of a ZMP and the calculation of stability on the side of the operator, the volume of communication data can be reduced, and hence, the safety system can be configured to be resistant to effects of a communication delay.

As an application mode of an additional display device, it is possible to contemplate a case in which a work supervisor performs the confirmation of conditions of the working machine 1 from a remote place. In such a case, a display for the work supervisor can be arranged at a site other than on the working machine 1 in addition to the display for the operator, and by performing a data transfer through wireless transmission or the like, the conditions of the working machine 1 can be displayed. The showing on the display for the supervisor may be the same as that for the operator, or information such as command quantities to the respective actuators may be additionally displayed.

<Addition of Simple Display>

In the example described above, the level of stability α calculated at the stability computing means 60*d* is displayed on the display 61*d* by using the bar 61*h*. It may be configured to arrange a simple display 61*x*, which performs only the display of the level of stability α, in addition to the display 61*d* and to display the bar 61*h* on the simple display 61*x*. As the location of arrangement of the simple display 61*x*, the front of the operator's seat, an outer wall of the working machine 1, or the like can be considered. As an alternative, it may be configured to arrange the simple display 61*x* alone without arranging the display 61*d*. The adoption of such a configuration makes it possible to inform the stability of the working machine 1 by a more economical and simpler configuration.

<Addition of Work Detail Determination Means>

As a setting method of the tipping warning region N, it may be contemplated to recognize the details of work, which is currently under way, and to change the size and shape of the tipping warning region N according to the details of the work.

At a work detail determination means 61*i*, characteristic control patterns in plural kinds of work such as suspending work, digging work, demolition work and traveling and tipping warning regions N fitted to the respective work details are set and stored beforehand. Lever stroke sensors 51 for detecting input command quantities to the respective drive actuators 11,13,15 are arranged, the closest one of the control patterns set beforehand is selected based on the records of the posture of the front working mechanism as calculated at the ZMP calculating means, the external force applied to the bucket and the detection values of the lever stroke sensors 51, and a corresponding tipping warning region N is outputted. By performing the determination of work details as described above, it is possible to set tipping warning regions suited for the respective kinds of work, and hence, to provide improved safety while keeping the work efficiency high.

<Addition of Recovery Operation Calculating Means>

A recovery operation calculating means 60*l* determines which one of the control levers 50 should be manipulated in which direction to permit recovering the stability.

When a warning command is issued at the stability computing means 60, it is desired to appropriately operate one or more of the control levers to recover the stability. It may, however, be considered that depending on surrounding conditions such as the tilt of a road surface and the level of the operator's skill, the operator may not find how the control should be made for the recovery of the stability and may increase a risk of tipping by a wrong control. To avoid such a problem, it is possible to assist a stability recovering operation and to reduce a risk of tipping by determining a control method for the recovery of the stability at the recovery operation calculating means 60*l* and outputting the control method to the display 61*d*.

Described specifically, upon issuance of a warning command at the stability computing means 60*d*, the recovery operation calculating means determines based on the posture and ZMP position 70 of the working machine 1 whether or not the control of the respective control levers 50 would move the ZMP position 70 toward the center of the support polygon L, and outputs to the display means 61 a control method that would move the ZMP position 70 toward the center. When the front working mechanism is directed forward of the undercarriage 2 and the ZMP position 70 is located forward of the normal region N, for example, it is desired to perform an operation such as slowly pulling the arm toward the working machine or slowly performing swinging to make the direction of the front working mechanism oblique to the undercarriage. The display means 61 displays on the display 61*d* the results of calculation by the recovery operation calculating means 60*l* as needed.

<Change to Warning Presentation Method>

In the example described above, stability information on the machine is presented to the operator by displaying the ZMP position 70 on the display 61*d* and warning a reduction in stability by the display 61*d* and warning device 63*d*. As another presentation method of stability information, a method that uses the control levers 50 or a seat 4 can be contemplated. For example, a warning can be made by vibrating the operation levers 50 or seat 4 upon issuance of a warning command at the stability computing means. On the other hand, the warning of a risk of tipping and the assistance to the stability recovering operation can be performed by making heavier the feeling of manipulation in a stability-deteriorating direction among manipulating directions of the control levers 50. By presenting the stability information on the machine by a method other than replying upon the display 61*d* and warning device 63*d* as described above, the operator is allowed to recognize the stability information and to be guided to a safe operation even when the operator is not watching the display 61*d* or in an environment where noise is so laud that a warning can be hardly heard.

Further, warning device 63*d* may be arranged in plural directions or at plural locations, respectively, relative to the seat 4, and a warning sound or the like may be produced from the warning device located in the direction of the ZMP position 70. By giving a warning according to the direction of the ZMP position 70, the operator is allowed to accurately recognize stability information including a direction, to which attention should be paid, even when he or she is not watching the display 61*d*.

<External Force Measuring Method>

In the example described above, the pin force sensors 43*a*, 44*a* are arranged to detect an external force applied to the bucket. As another detection method, there is a method that provides the boom cylinder with pressure sensors 11*a*,11*b*. According to this method, a moment Ml including the external force on the bucket and the own weight of the front working mechanism is calculated from detection values of the pressure sensors 11*a*,11*b* provided on the boom cylinder, and in addition, an own weight moment Moc of the front working mechanism is calculated from detection values of the respective angle sensors on the boom, arm and bucket and the respective center-of-gravity parameters of the boom, arm and bucket. The external force on the bucket is then calculated from the difference between the moments Ml and Moc and the distance from the boom pivot fulcrum 40 to the bucket 23.

Second Embodiment

Figure 12:
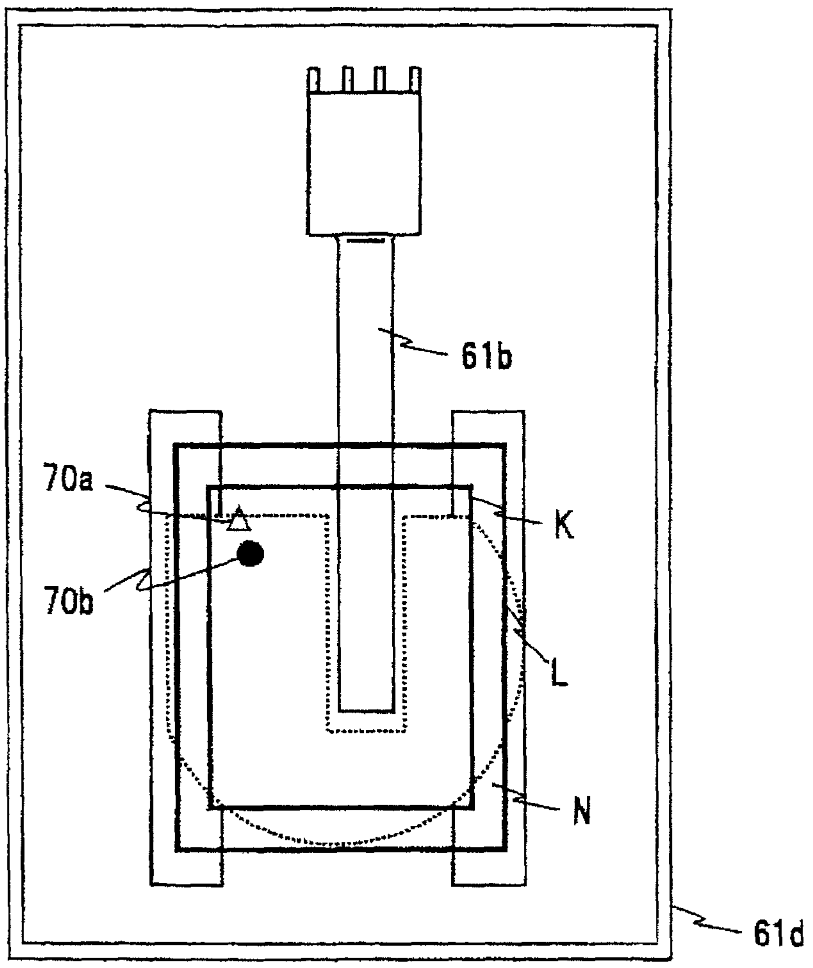
FIG. 12 is an illustration diagram showing a display according to a second embodiment.

The second embodiment of the present invention will next be described. In the second embodiment, a barycentric position, which is a mass center of the working machine 1, is used instead of the ZMP in the first embodiment. With reference to FIG. 12, a description will hereinafter be made primarily about this difference from the first embodiment.

<State Quantity Sensing Means>

A state quantity sensing means 49 in the second embodiment is provided with the posture sensor 3*b*, boom angle sensor 40*a*, arm angle sensor 41*a*, bucket angle sensor 42*a* and pin force sensors 43*a*,44*a* out of the sensors in the first embodiment.

<ZMP Computing Means>

A linkage computation is performed as in the first embodiment. In the second embodiment, detection values of the posture sensor 3*b*, swing angle sensor 3*s*, boom angle sensor 40*a* and pin force sensors 43*a*, 44*a* are sent to the linkage computing means 60*a*. The position vectors r2,r3,r10,r12 at the respective mass points 2P, 3P, 10P, 12P, the position vectors s43, s44 of the pins 43,44 and the respective external force vectors F43,F44 acting on the pins 43,44, all of which are shown in FIG. 4, are then converted to values based on the machine reference coordinate system (O-XYZ).

At the ZMP computing means 60*b*, amass center 70*b* of the working machine 1 is calculated by using the position vectors and external force vectors at the respective mass points, said vectors having been converted to the machine reference coordinate system based on the detection values of the respective sensors, and this mass center 70*b* is set as the ZMP position 70. The mass center 70*b* of the working machine 1 is derived as follows:

$$r_{cog} = \frac{\sum_i m_i r_i}{\sum_i m_i} \tag{8}$$

where, $r_{cog}$: mass center vector, $m_i$: mass at an $i^{th}$ mass point, $r_i$: position vector at the $i^{th}$ mass point, It is to be noted that each vector is a three-dimensional vector having an X-component, Y-component and Z-component.

In the safety system according to the present invention, the X-coordinate and Y-coordinate of the mass center 70*b* are evaluated. Therefore, the X-coordinate $r_{cogx}$ of the mass center 70*b* is calculated as follows:

$$r_{cogx} = \frac{\sum_i m_i r_{ix}}{\sum_i m_i} \tag{9}$$

Further, the Y-coordinate $r_{cogy}$ of the mass center 70*b* is similarly calculated as follows:

$$r_{cogy} = \frac{\sum_i m_i r_{iy}}{\sum_i m_i} \tag{10}$$

In the equations (9) and (10), m is the mass at each of the mass points 2P, 3P, 10P or 12P and the mass of the attachment 23 shown in FIG. 4, and the masses m2,m3,m10,m12 at the respective mass points and the mass of the attachment as calculated from the external force vectors F43, F44 applied to the pins 43,44 are substituted for m.

As has been described above, the ZMP computing means 60*b* can calculate the mass center 70*b* by using the detection values of the respective sensors arranged at the various parts of the working machine 1.

<Use of Z-Component at Mass Center>

In the above-described example, the X-component (X-coordinate) and Y-component (Y-coordinate) out of the X-component, Y-component and Z-component of the mass center vector $r_{cog}$ are used. It may be configured to use, in addition to them, the Z-component for the evaluation of stability and for display.

$$r_{cogz} = \frac{\sum_i m_i r_{iz}}{\sum_i m_i} \tag{11}$$

<Combined Use of Mass Center and ZMP>

In the above-described example, only the mass center 70*b* of the working machine 1 is used as the ZMP position 70. It is also possible to perform, in addition to the calculation of the mass center 70, the calculation of the ZMP 70*a* described in the first embodiment and to perform an evaluation by using these two as indexes of stability. In this case, the ZMP calculating means 60*f* performs the calculation of the ZMP 70*a* by using the equations (3) and (4) and the calculation of the mass center 70*b* by using the equations (9) and (10). It is also possible to configure such that the ZMP 70*a* and the mass center 70*b* are also used at the stability computing means 60*d* to issue different warning commands at respective means. It may be configured such that at the display means 61, a display is performed using different shapes and colors for the ZMP 70*a* and mass center 70*b*, respectively, as shown in FIG. 12.

Third Embodiment

Figure 13:
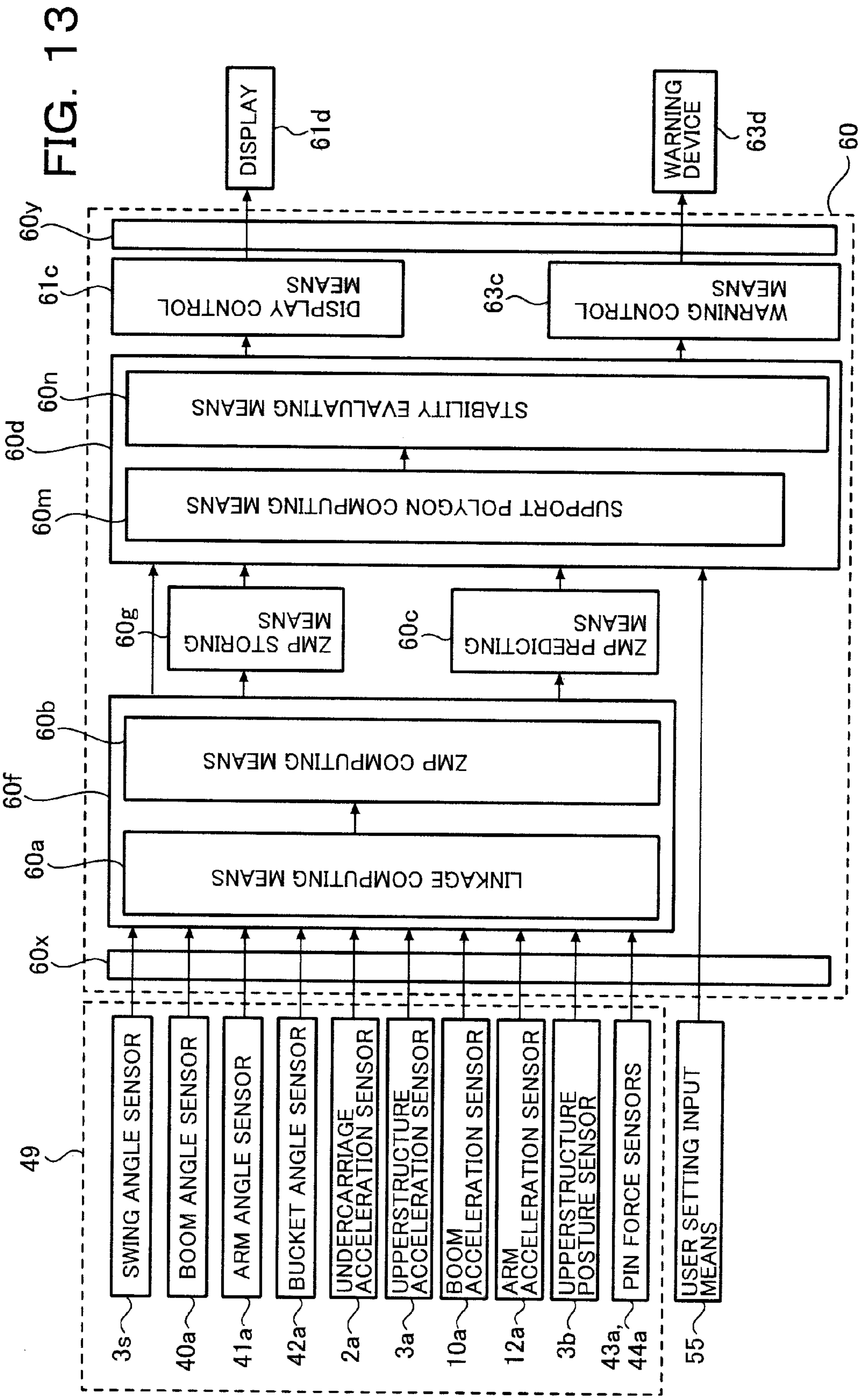
FIG. 13 is a block diagram illustrating a safety system according to a third embodiment for the working machine.
Figure 14:
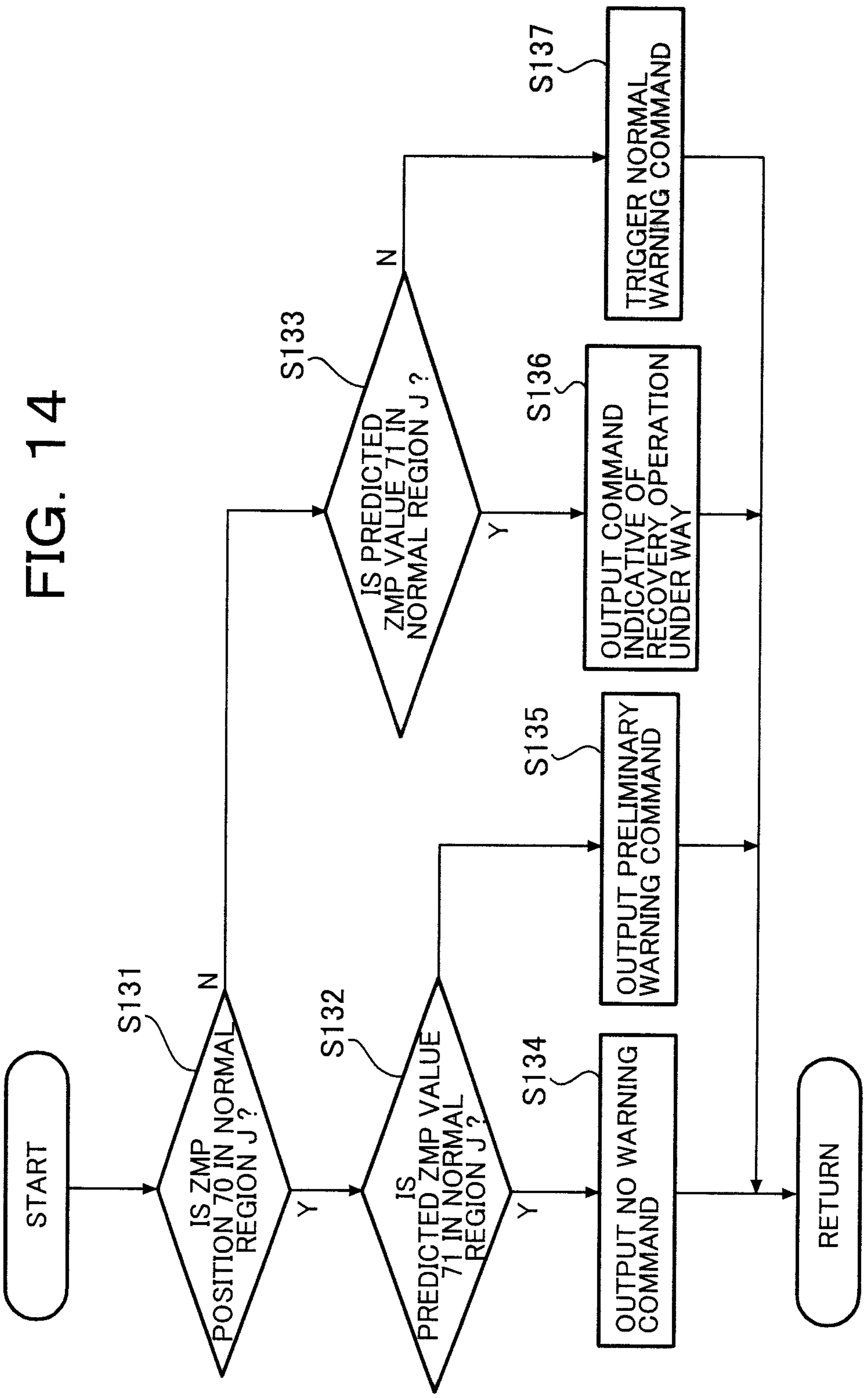
FIG. 14 is a flow chart illustrating a determination method by a stability computing means according to the third embodiment.

The third embodiment of the present invention will next be described with reference to FIG. 13 to FIG. 14. Different from the first and second embodiments, the third embodiment performs prediction of a behavior of the ZMP position 70 in the near future, and performs a display and warning by using predicted values. As a consequence, a still more prompt and flexible response is feasible. A description will hereinafter be made primarily about this difference from the second embodiment.

<ZMP Predicting Means>

At a ZMP predicting means 60*c*, a predicted value 71 of a ZMP position in the near future is calculated. Taking as an example a case in which the mass center 70*b* is used as the ZMP position 70, a description will be made about a method that calculates the predicted ZMP position 71 by using the current ZMP position 70 and ZMP position record 72.

When discussing changes in the ZMP position over a very short time, the moving speed of the ZMP position can be considered to be substantially constant. The predicted ZMP value 71 in the near future can, therefore, be predicted by calculating the moving speed of the ZMP position 70 from the current ZMP position 70 (mass center 70*b*) calculated at the ZMP calculating means 60*f* and the previous ZMP position record 72 stored in the ZMP storing means 60*g*.

The predicted ZMP position 71 after dt seconds can be calculated by the following equation.

$$x_{cogp} = x_{cog}[p] + \frac{(x_{cog}[p] - x_{cog}[p-1])}{(t[p] - t[p-1])} dt \tag{12}$$

where $X_{cog}[p]$ represents the ZMP position at a $p^{th}$ calculation point, t[p] represents the time at the $p^{th}$ calculation point, and $X_{cogp}$ represents the predicted ZMP position 71 after dt seconds from t[p].

<Stability Computing Means>

Based on the calculated value 70 from the ZMP calculating means 60*f* and the calculated value 71 from the ZMP predicting means 60*c*, discrimination of stability is performed at the stability computing means 60*d*.

The stability computing means 60*d* is comprised of the support polygon calculating means 60*m* and stability evaluating means 60*n* as in the first embodiment. The support polygon calculating means 60*m* is similar to the corresponding means in the first embodiment, and the setting of the tipping warning region N and the calculation of stability at the support polygon calculating means 60*n* are also similar to the corresponding setting and calculation in the first embodiment. It is to be noted that the ZMP position 70 calculated at the ZMP calculating means 60*f* is used in the calculation of the level of stability $\alpha$.

For the determination of a risk of tipping at the stability evaluating means 60*n*, the current ZMP position 70 calculated at the ZMP calculating means 60*f* and the predicted ZMP position 71 calculated at the ZMP predicting means 60*c* are both used as indexes. About the determination of a risk of tipping and a warning command, a description will be made using a flow chart of FIG. 14.

When the ZMP position 70 and predicted ZMP position 71 are both in the normal region J, the working machine 1 is determined to have stability and no warning command is outputted (steps 131,132,134).

When the ZMP position 70 is in the normal region J and the predicted ZMP position 71 is in the tipping warning region N, the working machine 1 is determined to have an increased risk of tipping and a preliminary warning command is outputted to produce a preliminary warning (steps 131,132,135).

When the ZMP position 70 is in the tipping warning region N but the predicted ZMP position 71 is in the normal region J, a recovery operation from a low-stability state is determined to be under way, and a command indicative of a recovery operation under way is outputted (steps 131,133,136).

When the ZMP position 70 and the predicted ZMP position 71 are both in the tipping warning region N, the working machine 1 is determined to have a risk of tipping and an emergency warning command is triggered (steps 131,133, 137).

By using the predicted ZMP position 71 as a further evaluation index in addition to the ZMP position 70 as described above, it is possible to evaluate the stability to be achieved when the current operation would be continued, and hence, to take a measure at a still earlier stage. It is also possible to determine a case where the recovery of stability by the current operation is promised, and then to change the warning method. Accordingly, a discomfort of the operator due to a surfeit of warnings can be decreased.

As described above, the existence of a risk of tipping is determined at the stability evaluating means 60*n* when the ZMP position 70 and the predicted ZMP position 71 are both in the tipping warning region N. It may, however, be configured such that, even when both of these positions are in the tipping warning region N, a stability-recovering operation is determined to be under way when the stability at the predicted ZMP position 71 is higher than the stability at the ZMP position 70 and a similar command is triggered as in the case that the ZMP position 70 is in the tipping warning region N and the predicted ZMP position 71 is in the normal region J. Accordingly, changes can be made to the warning method during all stability-recovering operations, and a discomfort of the operator due to a surfeit of warnings can be decreased.

<Display>

Figure 15A:
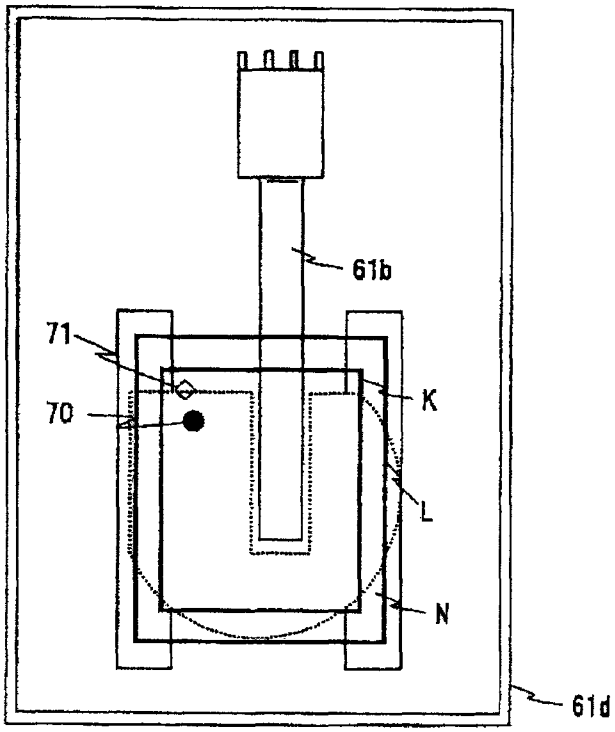
FIGS. 15(*a*) and 15(*b*) are illustration diagrams respectively showing examples of a display according to the third embodiment.
Figure 15A:
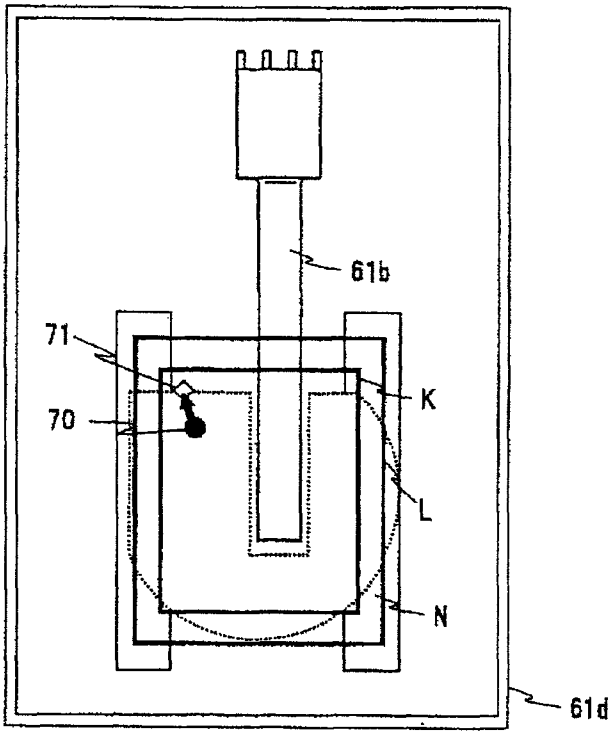

At the display means 61, the display of stability information and tipping warning information is performed as in the first embodiment. A description will hereinafter be made only about a utilization method of the predicted ZMP position 71 which is a difference from the first embodiment. As shown in FIG. 15(*a*), the ZMP position 70 and the predicted ZMP position 71 are displayed on the top plan view 61*b* shown on the display 61*d* by using different colors and shapes. Further, it may be configured to display an arrow mark from the ZMP position 70 to the predicted ZMP position 71 as shown in FIG. 15(*b*).

At the time of a tipping warning command, a change is performed to the background color of the display screen as in the first embodiment. The display 61*d* is provided with at least 4 background colors for a normal time, the time of a preliminary warning, the time of a recovery operation and the time of a normal warning, respectively. According to a command from the stability computing means 60*d*, the display control means 61*c* triggers a command to the display 61*d* such that the background color is changed.

<Warning Means>

At the warning means 63, a warning such as a warning sound is produced by a command from the stability computing means 60*d* as in the first embodiment. The warning device 63*d* in the third embodiment is provided with at least three kinds of warning sounds for the time of a preliminary warning, the time of a warning and the time of a recovery operation, respectively, and the warning control means 63*c* triggers a command to the warning device 63*d* such that a warning sound corresponding to the kind of a warning command from the stability computing means 60*d* is produced.

In the example described above, the current ZMP position 70 and predicted ZMP position 71 are used at the stability computing means 60*d* and display means 61. As an alternative, the ZMP position record 72 stored in the ZMP storing means 60*g* may be used instead of the current ZMP position 70. The use of the ZMP position record 72 and predicted ZMP position 71 makes it possible to determine a risk of tipping by replacing the ZMP position 70 to the ZMP position record 72 in the flow chart of FIG. 13.

In the example described above, the mass center 70*b* of the working machine is used as the ZMP position 70. As an alternative, the use of ZMP 70*a* also makes it possible to perform an evaluation, which makes use of a predicted value, in a similar manner.

<Calculation of Predicted Value by Use of Lever Strokes>

In the example described above, the predicted ZMP position 71 is calculated from the current ZMP position 70 and previous ZMP position record 72. As another method for calculating the predicted ZMP position 71, there is a method that detects input quantities (lever strokes) from the operator to the respective drive actuators 11,13,15 of the working machine 1. In general, the speed of each actuator is determined by a corresponding lever stroke in a working machine. Accordingly, the control levers 50 are provided with lever stroke sensors 51 to estimate the speeds of the drive actuators 11,13,15. The actuator speeds are converted to angular velocities of the corresponding pivot angles, respectively, by link computation, and from the current posture and calculated angular velocities, the positions of the respective mass points after dt seconds are calculated. By substituting the calculated positions of the mass points in the equations (9) and (10), the predicted ZMP position 71 after the dt seconds can be calculated.

Although the use of this method requires the lever stroke sensors 51 to detect the lever strokes, the calculation of a predicted value can be performed in conjunction with an input from the operator, thereby making it possible to bringing a warning into better conformity with the operator's feeling of manipulation.

Fourth Embodiment

Recording and Reproduction

The fourth embodiment of the present invention will be described with reference to FIG. 16 to FIG. 18. Compared with the first embodiment, it is additionally possible for the fourth embodiment to record the details of work and ZMP positions during the work and to reproduce them after the work. A description will hereinafter be made primarily about this difference from the first embodiment.

Figure 16:
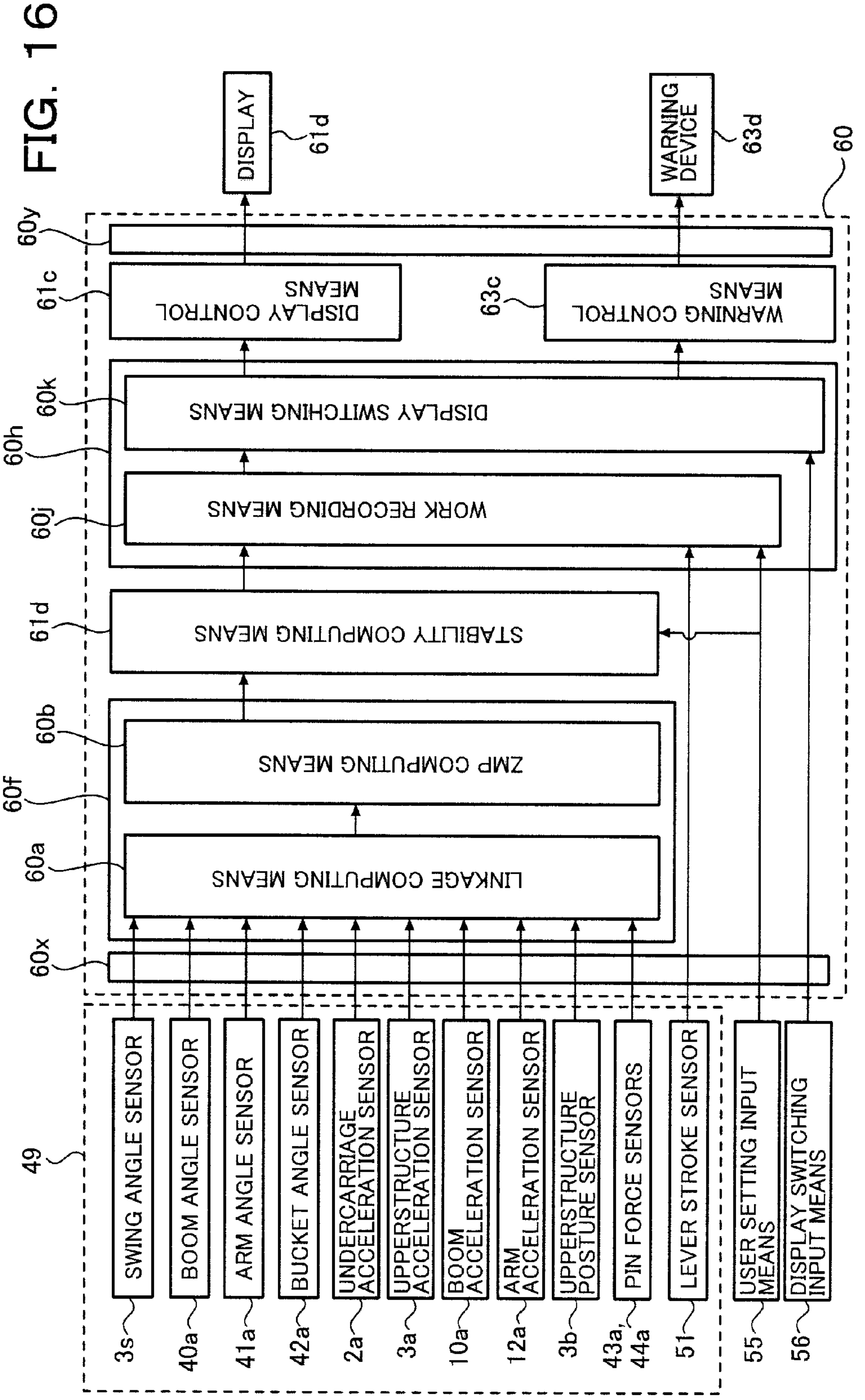
FIG. 16 is a block diagram illustrating a safety system according to a fourth embodiment for the working machine.

FIG. 16 is an outline construction diagram illustrating the fourth embodiment. In addition to the elements of the first embodiment, the fourth embodiment has a recording and reproducing means 60*h* for performing recording and reproduction of the details of work and ZMP positions during work.

<State Quantity Detecting Means>

In addition to the sensors which make up the first embodiment, the lever stroke sensors 51 are also arranged to detect input quantities from the operator to the respective drive actuators 11,13,15 of the working machine 1. Usable as the lever control sensors 51 are, for example, angle sensors for detecting tilt amounts of the control levers 50 or pressure sensors for detecting pilot pressures determined by reducing valves arranged inside the respective control levers 50.

<Recording and Reproducing Means>

The recording and reproducing means 60*h* is comprised of a display switching input means 56, a work recording means 60*j*, and a display switching means 60*k*. The display switching input means 56 enables the operator to trigger a display switching command between an operation-time display and a reproduction-time display. The work recording means 60*j* enables the operator to perform recording of the details of work and ZMP positions during the work. The display switching means 60*k* enables the operator to trigger a command to the display control means 61*c* and warning control means 63*d* according to an input from the display switching input means 56.

<Work Recording Means>

Performed at the work recording means 60*j* is the recording of the details of work and ZMP positions during a predetermined time period. The time period, in which records are to be maintained, may be a time set beforehand, such as 10 minutes or 1 day, or may be determined, for example, to run from a start to a stop of the engine.

Recorded as the details of work in the work recording means 60*j* include the recording of detection values of the lever stroke sensors 51, pivot angles of respective pivot joints, an external force applied to the bucket as calculated at the linkage computing means 60*a*, and a working radius calculated from a posture of the front working mechanism. Also recorded as stability information include the ZMP position 70 calculated at the ZMP calculating means 60*f* and the level of stability $\alpha$ calculated at the stability computing means 60*d*. As warning information, warning commands and various setting information such as tipping warning regions N are recorded. The recording of warning commands and various setting information may be continuously performed during the preset time period like the recording of the details of work and ZMP positions, or may be performed only in time periods before and after a warning command is issued and before and after a change is made to any setting. The volume of data to be recorded can be reduced by limiting the time period of recording.

<Display Switching Means>

The display switching means 60*k* recognizes, based on an input from the display switching input means 56, which one of the operation-time display and reproduction-time display has been selected, and triggers a command to the display control means 61*c* and warning control means 63*d* such that switching is performed between the operation-time display and the reproduction-time display.

<Display>

The display means 61 displays by performing switching between the operation-time display and the reproduction-time display according to the command from the display switching means 60*k*. The operation-time display is similar to that in the first embodiment. A description will hereinafter be made about the reproduction-time display.

Figure 17:
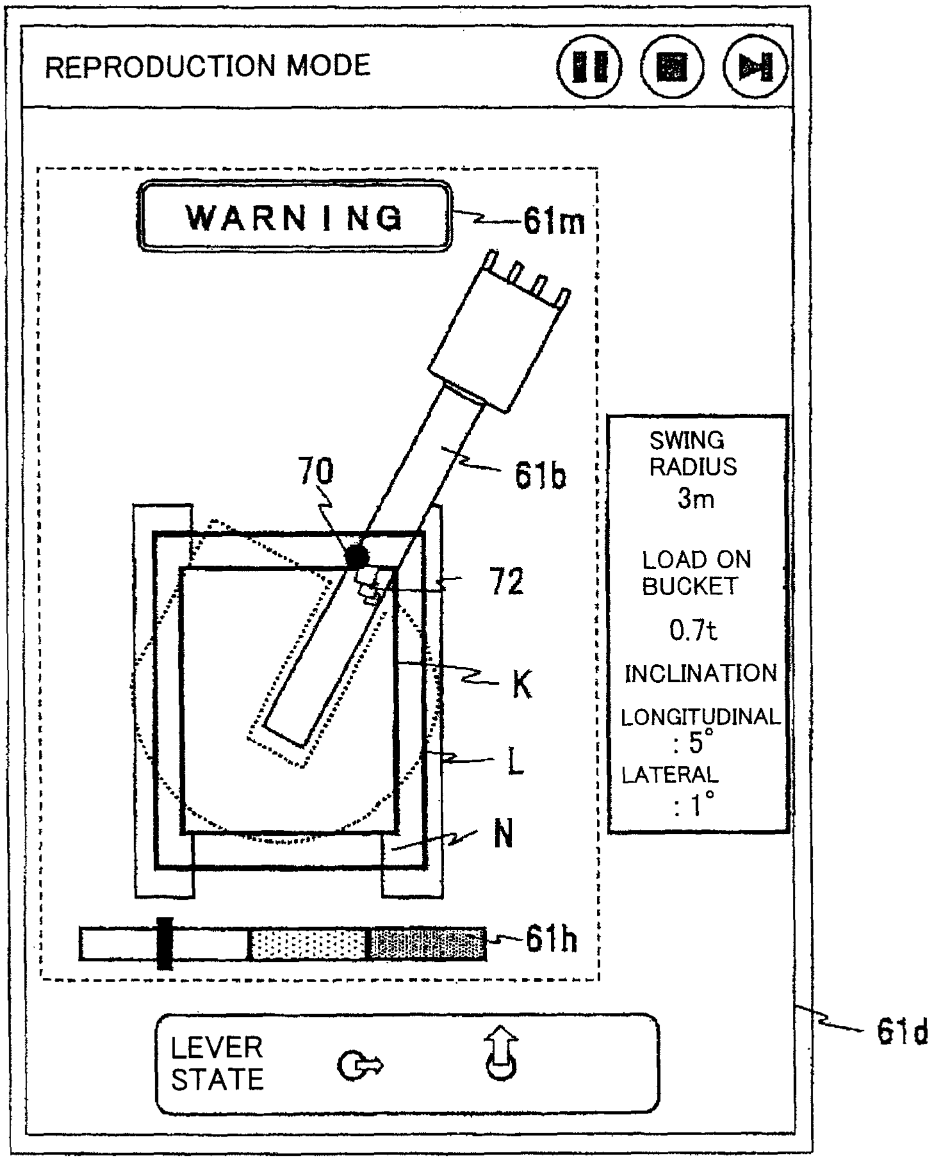
FIG. 17 is an illustration diagram showing an example of a display according to the fourth embodiment for the working machine.

FIG. 17 shows one example of a display at the time of reproduction. Using the ZMP position 70 and level of stability $\alpha$ recorded in the work recording means 60*j*, the display of stability information and tipping warning information similar to those at the time of operation is performed. The background color of the screen and the warning message are set identical to those to be displayed at the time of operation. By performing the same display as at the time of operation, it is possible to grasp what information was presented to the operator during an operation.

At the time of reproduction, a display of information on manipulation by the operator and information on a working environment is performed in addition to a display of similar stability information as at the time of operation. As the information on the manipulation by the operator, detection values of the lever stroke sensors 51 as recorded in the work recording means 60*j* are used. In the example illustrated in FIG. 17, an operation of the working machine 1 is performed by using two levers. Concerning each lever, the direction of an input by the control lever is indicated by the direction of an arrow, while a stroke of the lever is indicated by the size or length of the arrow. As the information on the working environment, an external force applied to the bucket, a working radius, a road tilt, and the like are displayed.

In the foregoing, the operation of the working machine 1 is expressed by displaying the lever strokes and working radius. As an alternative, it may be configured to display, instead of the top plan view 61*b*, an illustrated three-dimensional view showing a simplified view of the working machine 1 and to reproduce on the illustrated view an actual operation based on recorded rotation and pivot angles.

Figure 18:
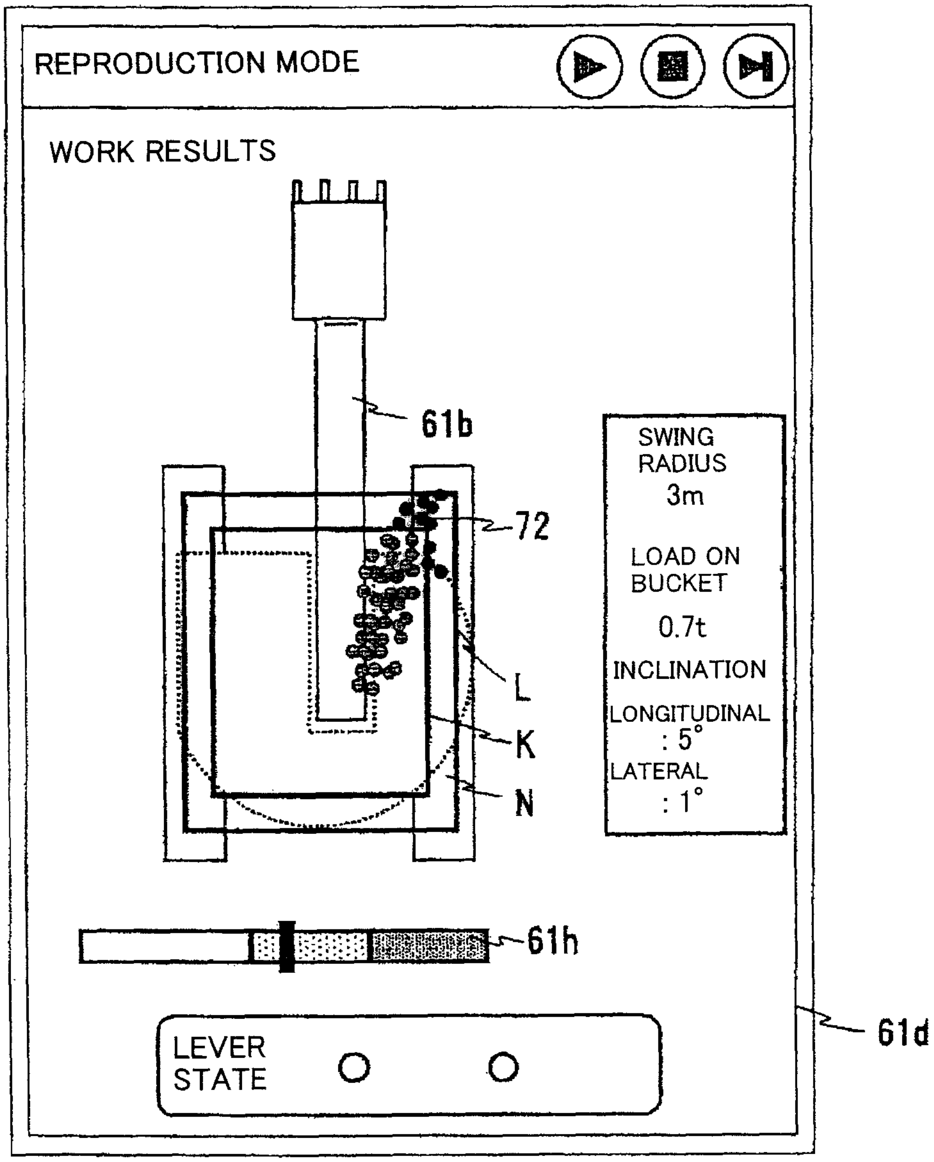
FIG. 18 is an illustration diagram showing another example of the display according to the fourth embodiment for the working machine.

Upon completion of the reproduction, the ZMP position record 72 during the time period of reproduction is displayed as the results of the work as shown in FIG. 18. Further, the average of stability during the time period of reproduction is also displayed at the stability level display bar 61*h*.

Different from the display of, primarily, the stability information at the time of operation as shown in FIG. 5, the display of additional information such as lever strokes and a swing radius at the time of reproduction allows the operator to accurately grasp the previous state of work. In addition, the stability in a series of work can be evaluated by displaying work results.

In the example described above, the reproduction-time display is assumed to be performed on the display arranged in the operator's seat 4. As another utilization mode of the recording and reproducing means, it is possible to contemplate a case in which the confirmation of operating conditions is performed at a site other than on the working machine 1. In such a case, it may be configured such that the information recorded in the work recording means 60*j* is taken out of the working machine 1 by using an external recording medium, wireless transmission or the like and is reproduced on a display arranged at the site other than on the working machine 1.

The reproduction-time display is considered to find utility in the management of work based on the safety evaluation of operations, education, enlightenment activities and the like in addition to its utilization for the grasp and investigation of the status and cause of occurrence of an accident upon its occurrence.

As has been described above, the safety system according to the present invention has the controller provided with the state quantity sensing means for detecting a posture of the working machine, the ZMP calculating means for calculating a ZMP position of the working machine, and a display; and displays a top plan view of the working machine, and on the top plan view, also displays a support polygon, which is formed by the ground contact points between the working machine and a ground surface, and the ZMP position. Accordingly, the stability can be evaluated by unified indexes even during work in which the posture changes variously, thereby allowing the operator to readily and precisely recognize the specific stability.

The display in the present invention displays by making a relative rotation over a swing angle between the undercarriage and the upperstructure in the top plan view. Accordingly, the operator is allowed to recognize the relation between the support polygon and ZMP position and the direction of the front working mechanism during work including swing operations. The operator is also allowed to recognize the direction of traveling.

The safety system according to the present invention has the ZMP storing means for storing the history of the ZMP position over a predetermined time set beforehand, and displays ZMP position records. Accordingly, the operator is allowed to recognize changes in the ZMP position and also to recognize an increase or decrease in stability by the current operation.

The display in the present invention displays the current ZMP position, which has been calculated at the ZMP calculating means, and a ZMP position record in modes different from each other. Accordingly, the operator is allowed to more readily recognize the relation between the previous and current ZMP positions.

The safety system according to the present invention has the ZMP predicting means for predicting a behavior of the ZMP position, and displays the result of the calculation by the ZMP predicting mean. Accordingly, the operator is allowed to recognize a ZMP position to be taken when the current operation would be continued, and hence, to take a measure at an earlier stage.

The display in the present invention displays the current ZMP position, which has been calculated at the ZMP calculating means, and a predicted ZMP position, which has been calculated at the ZMP predicting means, in modes different from each other. Accordingly, the operator is allowed to more readily recognize the relation between the current and future ZMP positions.

The safety system according to the present invention has the stability computing means for setting a normal region and tipping warning region in a central part and peripheral part, respectively, of a support polygon formed by the ground contact points between the working machine and a ground surface, and triggering a warning command when the ZMP position is in the tipping warning region, and displays the tipping warning region on a top plan view displayed on the display, and performs changes to the display of a warning and the background color when a warning command is triggered by the stability computing means. Accordingly, the operator is allowed to instantaneously grasp a risk of tipping without keeping a close watch on the screen.

The stability computing means in the present invention uses the current ZMP position, which has been calculated at the ZMP computing means, and a ZMP position record, which has been recorded in the ZMP storing means. Accordingly, it is possible to make an evaluation as to whether or not the stability has been improved by the current work, and hence, to avoid a surfeit of warnings.

The stability computing means in the present invention uses the current ZMP position, which has been calculated at the ZMP computing means, and a predicted ZMP position, which has been calculated at the ZMP predicting means. Accordingly, it is possible to evaluate stability to be achieved when the current operation would be continued, and hence, to produce a warning at an earlier stage and to avoid a surfeit of warnings.

The stability computing means in the present invention calculates the level of stability of the working machine from the ratio of the distance from the center of a support polygon to the ZMP position to the distance from the center of the support polygon to one of the sides of the support polygon, and displays the calculated level of stability on the display. Accordingly, the operator is allowed to readily recognize an increase or decrease in stability.

The safety system according to the present invention has the work detail determination means for determining, from a change in the posture of the working machine, to which one of plural work patterns set beforehand the current work corresponds, and based on the results of the determination by the work detail determination means, the stability computing means uses tipping warning regions set beforehand for the respective work patterns. Accordingly, it is possible to set a tipping warning region suited to each work, and hence, to keep the work efficiency higher.

The safety system according to the present invention has the warning means, and outputs a sound or voice when a warning command is triggered by the stability computing means. Accordingly, the operator is allowed to recognize a risk of tipping even when he or she is not watching the display, and further, adjacent workers are also allowed to recognize the risk of tipping.

The warning means in the present invention changes the sound or voice according to the stability calculated at the stability computing means. Accordingly, the operator is allowed to correctly recognize the stability even when he or she is not watching the display, and further, adjacent workers are also allowed to accurately recognize the stability.

The safety system according to the present invention has the sensing means for detecting command values to the drive actuators, and also, the recording and reproducing means for storing the command values to the drive actuators and the ZMP position over a predetermined time and performing reproduction of work conditions, and at the time of reproduction, shows the command values and performs a display different from that at the time of work. Accordingly, it is possible to perform the grasp and investigation of the status and cause of occurrence of an accident upon its occurrence, the management of work based on the safety evaluation of operations, education, and enlightenment activities.

As has been described above, by displaying the tipping warning region for the working machine and its current ZMP position on the top plan view displayed on the display, the embodiments of the present invention can evaluate the stability based on unified indexes even during work in which the posture changes variously. Accordingly, the operator is allowed to instantaneously, readily and precisely recognize the stability of the working machine.

When the existence of a risk of tipping is determined, a warning by a display or a warning sound or voice is performed to call the operator's attention at an early stage so that the operator can be guided to a safer operation and can perform safe work with high efficiency.

In the examples described above, the ZMP of the working machine is calculated at the ZMP calculating means. However, similar advantageous effects can be brought about when the mass center of the working machine is calculated as described above in the second embodiment.

LEGEND

1 Working machine
2 Undercarriage
**2*a*** Acceleration sensor (Undercarriage)
3 Upperstructure
**3*a*** Acceleration sensor (Upperstructure)
**3*b*** Posture sensor (Upperstructure)
**3*c*** Center line
**3*s*** Swing angle sensor
4 Operator's cab
5 Engine
6 Front working mechanism
7 Swing motor
8 Counterweight
10 Boom
**10*a*** Acceleration sensor (boom)
11 Boom cylinder
**11*a*** Pressure sensor (boom bottom)
**11*b*** Pressure sensor (boom rod)
12 Arm
**12*a*** Acceleration sensor (arm)
13 Arm cylinder
15 Working attachment cylinder
16 Link (A)
17 Link (B)
23 Bucket
30 Ground surface
40 Boom pivot fulcrum
**40*a*** Angle sensor (boom pivot fulcrum)
41 Arm pivot fulcrum
**41*a*** Angle sensor (arm pivot fulcrum)
42 Bucket pivot fulcrum
**42*a*** Angle sensor (bucket pivot fulcrum)
43 Pin (bucket-arm)
**43*a* External force sensor (pin 43**)
44 Pin (bucket-link)
**44*a* External force sensor (pin 44**)
49 State quantity sensing means
50 Control levers
51 Lever stroke sensors
55 User setting input means
56 Display switching input means
59 Speed calculating means
60 Controller
**60*a*** Linkage computing means
**60*b*** ZMP computing means
**60*c*** ZMP predicting means
**60*d*** Stability computing means
**60*f*** ZMP calculating means
**60*g*** ZMP storing means
**60*h*** Recording and reproducing means
**61*i*** Work detail determination means
**60*j*** Work recording means
**60*k*** Display switching means
**60*l*** Recovery operation calculating means
**60*m*** Support polygon calculating means
**60*n*** Stability evaluating means
**60*x*** Input unit
**60*y*** Output unit
61 Display means
**61*d*** Display
**61*b*** Top plan view of the working machine
**61*h*** Stability level display bar
**61*k*** Setting input icons
**61*m*** Warning message
**61*x*** Simple display
62 Drive actuator
63 Warning means
**63*d*** Warning device
70 ZMP position
**70*a*** ZMP
**70*b*** Mass center
71 Predicted ZMP position
72 ZMP position record

The invention claimed is:

1. A safety system for a working machine provided with an undercarriage, a working machine main body mounted on the undercarriage, a front working mechanism attached pivotally in an up-and-down direction to the working machine main body, and a controller for controlling these undercarriage, working machine main body and front working mechanism, wherein:

the controller is provided with a ZMP calculating means for calculating coordinates of a ZMP by using position information, acceleration information and external force information on respective movable portions of the main body, which includes the front working mechanism, and undercarriage, and a stability computing means for calculating a support polygon formed by plural ground contact points of the working machine with a ground, and, when the ZMP position is included in a warning region formed inside a perimeter of the support polygon, producing a tipping warning;

the safety system is provided with a display for displaying a top plan view of the working machine and the ZMP position of the working machine relative to the support polygon;

the ZMP calculating means and stability computing means compute and display the ZMP position and the support polygon including the warning region therein; and the safety system produces the tipping warning when the calculated ZMP position is included in the warning region formed inside the perimeter of the support polygon.

2. The safety system according to claim 1, wherein:

the controller has a ZMP storing means for storing a record of the ZMP position during a predetermined time period set beforehand, and displays the record of the ZMP position by the display.

3. The safety system according to claim 1, wherein:

the controller has a ZMP predicting means for predicting a behavior of the ZMP position, and on the display, displays results of the prediction by the ZMP predicting means.

4. The safety system according to claim 1, wherein:

the controller has at least one of a ZMP storing means for storing a record of the ZMP position during a predetermined time period set beforehand and a ZMP predicting means for predicting a behavior of the ZMP position, and the stability computing means performs determination of stability by using, in addition to a current ZMP position calculated at the ZMP calculating means, at least one of the record of the ZMP position stored in the ZMP storing means and a predicted ZMP position calculated at the ZMP predicting means.

5. The safety system according to claim 1, wherein:

the controller has a stability computing means for calculating a level of stability of the working machine based on the ZMP position relative to the support polygon, and the display displays the level of stability calculated at the stability computing means.

6. The safety system according to claim 1, wherein:

the controller has a recovery operation calculating means for calculating an operation method that restores stability when a warning command is triggered by the stability computing means, and the display displays results of the calculation by the recovery operation calculating means when the warning command is triggered by the stability computing means.

7. The safety system according to claim 1, wherein:

the controller has a recording and reproducing means for performing reproduction of a state of work by storing, at a predetermined time, a command value to a drive actuator as detected by a state quantity sensing means and the ZMP position, and the recording and reproducing means performs a display that shows the command value upon reproduction of the state of work by the working machine.

8. The safety system according to claim 1, wherein:

the controller has, in place of the ZMP calculating means, a center-of-gravity calculating means for calculating a mass center of the working machine from the position information and known mass information on the respective movable portions of the main body, which includes the front working mechanism, and undercarriage, and each means uses the mass center instead of the ZMP.

* * * * *